United States Patent
Omori et al.

(10) Patent No.: US 10,556,729 B2
(45) Date of Patent: Feb. 11, 2020

(54) GAS BARRIER PACKAGING MATERIAL PRECURSOR AND GAS BARRIER PACKAGING MATERIAL

(71) Applicant: TOPPAN PRINTING CO., LTD., Tokyo (JP)

(72) Inventors: Noboru Omori, Tokyo (JP); Haruka Omori, Tokyo (JP); Katsumi Kawaguchi, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 592 days.

(21) Appl. No.: 15/134,856

(22) Filed: Apr. 21, 2016

(65) Prior Publication Data

US 2016/0229605 A1    Aug. 11, 2016

Related U.S. Application Data

(63) Continuation of application No. PCT/JP2014/077206, filed on Oct. 10, 2014.

(30) Foreign Application Priority Data

Oct. 25, 2013   (JP) .................... 2013-222433

(51) Int. Cl.
| | | |
|---|---|---|
| B32B 9/00 | (2006.01) | |
| B32B 9/04 | (2006.01) | |
| B65D 65/40 | (2006.01) | |
| B32B 27/36 | (2006.01) | |
| B32B 7/12 | (2006.01) | |
| B32B 27/08 | (2006.01) | |
| B32B 27/18 | (2006.01) | |
| B32B 27/30 | (2006.01) | |

(52) U.S. Cl.
CPC ............ *B65D 65/40* (2013.01); *B32B 7/12* (2013.01); *B32B 27/08* (2013.01); *B32B 27/18* (2013.01); *B32B 27/308* (2013.01); *B32B 27/36* (2013.01); *B32B 2307/7242* (2013.01); *B32B 2439/70* (2013.01); *B32B 2439/80* (2013.01)

(58) Field of Classification Search
CPC ....... B65D 65/40; B32B 27/08; B32B 27/308; B32B 27/18; B32B 27/36; B32B 2307/7242; B32B 2439/80; B32B 7/12; B32B 2439/70
USPC ...................... 428/448, 446, 411.1
See application file for complete search history.

(56) References Cited

U.S. PATENT DOCUMENTS

| | | | |
|---|---|---|---|
| 2008/0081140 A1 | 4/2008 | Kashimura et al. | |
| 2010/0136350 A1* | 6/2010 | Inaba | B32B 7/12 428/447 |
| 2011/0123799 A1* | 5/2011 | Yasui | C08F 220/18 428/354 |
| 2011/0217561 A1* | 9/2011 | Fujimura | C08K 3/22 428/480 |
| 2016/0075910 A1* | 3/2016 | Omori | C08J 7/047 428/480 |

FOREIGN PATENT DOCUMENTS

| | | |
|---|---|---|
| CN | 102216404 A | 10/2011 |
| EP | 2 151 320 A1 | 2/2010 |
| EP | 2 351 803 A1 | 8/2011 |
| JP | 2005-074731 A | 3/2005 |
| JP | 2006-341522 A | 12/2006 |
| JP | 4200972 B2 | 12/2008 |
| JP | 2009-006707 A | 1/2009 |
| JP | 4205806 B2 | 1/2009 |
| JP | 4365826 B2 | 11/2009 |
| JP | 4373797 B2 | 11/2009 |
| JP | 5012895 B2 | 8/2012 |
| WO | WO-2012/093597 A1 | 7/2012 |
| WO | WO 2014/192500 A1 | 12/2014 |

OTHER PUBLICATIONS

Extended European Search Report dated May 29, 2017 in corresponding European Patent Application No. 14856046.9.
International Search Report and Written Opinion of the International Searching Authority in International Patent Application No. PCT/JP2014/077206 dated Dec. 9, 2014.
Office Action dated Mar. 9, 2017 in corresponding Chinese Patent Application No. 201480058529.7.

* cited by examiner

*Primary Examiner* — Jessica Whiteley
(74) *Attorney, Agent, or Firm* — Foley & Lardner LLP (57) ABSTRACT

A gas barrier packaging material precursor, includes a support; an adhesion layer on one surface of the support; and a barrier layer and a protective layer formed adjacent each other on the adhesion layer. The adhesion layer contains a silicon compound composite. The protective layer is formed of a coating liquid containing a polyvalent metal compound, a polyester resin, and a dispersant, with the polyvalent metal compound being about 40 to about 90 mass % relative to 100 mass %. When the barrier layer is separated from the gas barrier packaging material precursor to measure an infrared absorption spectrum of the barrier layer by a transmission method, a ratio ($\alpha/\beta$) of a maximum peak height ($\alpha$) of absorbance in a range of about 1490 to about 1659 cm$^{-1}$ to a maximum peak height ($\beta$) of absorbance in a range of about 1660 to about 1750 cm$^{-1}$ is less than about 1.

24 Claims, 2 Drawing Sheets

GAS BARRIER PACKAGING MATERIAL PRECURSOR AND GAS BARRIER PACKAGING MATERIAL

CROSS-REFERENCE TO RELATED PATENT APPLICATIONS

This application is a continuation application filed under 35 U.S.C. § 111(a) claiming the benefit under 35 U.S.C. §§ 120 and 365(c) of PCT International Application No. PCT/JP2014/077206 filed on Oct. 10, 2014, which is based upon and claims the benefit of priority of Japanese Application No. 2013-222433, filed on Oct. 25, 2013, the entire contents of them all are hereby incorporated by reference.

TECHNICAL FIELD

The present invention relates to a gas barrier packaging material precursor and a gas barrier packaging material.

BACKGROUND

Packaging materials used for packaging food products, pharmaceutical products, and the like are desired to prevent deterioration of the contents. For example, it is desired that packaging materials for food products are able to minimize oxidation and deterioration of protein, oils, fats, and the like and further preserve the flavor and freshness. Also, it is desired that packaging materials for pharmaceutical products, which must be handled under aseptic conditions, are able to minimize deterioration of the active ingredients in the contents and retain the efficacy of the active ingredients.

Such deterioration of contents is mainly caused by oxygen or water vapor transmitted through the packaging material or other gases that react with the contents. Therefore, packaging materials used for packaging food products, pharmaceutical products, and the like are desired to have properties of not transmitting gases, such as oxygen and water vapor, therethrough (gas barrier properties).

To meet such requests, there have been used conventionally gas barrier films configured with polymers having relatively high gas barrier properties (gas barrier polymers), or laminates (laminated films) using gas barrier films as base films.

Conventionally, polymers containing a highly hydrophilic hydrogen bonding group in the molecules, as represented by poly(meth)acrylic acid or polyvinyl alcohol, have been used as gas barrier polymers. Packaging materials made of such polymers exhibit very good gas barrier properties against oxygen and the like under dry conditions. However, the packaging materials made of such polymers have suffered from problems of their gas barrier properties against oxygen and the like being greatly impaired under highly humid conditions due to the hydrophilicity of the hydrogen bonding group, and being poor in resistance to humidity and hot water.

To solve such problems, it is known that a polycarboxylic acid polymer layer and a polyvalent metal compound-containing layer, which are permitted to be adjacent to each other, are laminated onto a substrate, and a reaction is provoked between the two layers to produce a polyvalent metal salt of the polycarboxylic acid polymer, thereby providing a gas barrier packaging material (e.g., refer to PTLs 1 and 2). According to the disclosure, the gas barrier packaging material thus obtained has high oxygen gas barrier properties even under high humidity conditions.

Further, there is known a gas barrier packaging material in which the oxygen gas barrier properties do not have a dependence on humidity. In this case, by applying retort treatment, the gas barrier packaging material can be spared the need for expressing the oxygen gas barrier properties (e.g., refer to PTLs 3 to 5).

CITATION LIST

Patent Literature

PTL 1: JP-B-4373797
PTL 2: JP-B-5012895
PTL 3: JP-B-4200972
PTL 4: JP-B-4205806
PTL 5: JP-B-4365826

SUMMARY OF THE INVENTION

Technical Problem

However, to express the gas barrier properties, the gas barrier packaging materials described in PTLs 1 and 2 have to form polyvalent metal salts of a polycarboxylic acid polymer by reaction of the polycarboxylic acid polymer with the polyvalent metal compound. Therefore, the gas barrier packaging materials have to be retort-treated or exposed to a highly humid environment for a long period of time. To ensure that the gas barrier packaging materials can withstand retort treatment, the layer made of a polyvalent metal salt of the polycarboxylic acid polymer has to be adhered firmly to the substrate. However, when a generally used adhesive is used, sufficient adhesion strength is not necessarily obtained, delamination (interlayer separation) may be caused. In addition, there is a risk of causing blocking (a phenomenon of causing adhesion of the coated surface of the substrate to the non-coated surface thereof when taken up) unless two-layer coating (coating for forming substrate/adhesive layer/polycarboxylic acid polymer layer) is continuously performed by means of a special coater having two coating units (two-head coater) or a multi-color printer, in laminating the polycarboxylic acid polymer layer and the polyvalent metal compound-containing layer onto the substrate.

Being provided with a deposited film of an inorganic compound, the gas barrier packaging materials described in PTLs 3 and 4 have oxygen gas barrier properties and water vapor barrier properties. However, due to the deposited film being easily broken, these gas barrier packaging materials have suffered from a problem of the oxygen gas barrier properties and water vapor barrier properties being easily impaired when subjected to abusive treatment, such as bending and stretching, and high-temperature and high-pressure treatment, such as retort treatment.

The gas barrier packaging material described in PTL 5 has suffered from a problem that, due to the formation in advance of the polyvalent metal salt with the polycarboxylic acid polymer in the manufacturing procedure, the resistance to a physical load, such as bending and pulling, is low, as in PTLs 3 and 4, and the gas barrier properties are prone to decrease.

Further, the precursor liquid (normally stored without adding a curing agent and used as a coating liquid by adding a curing agent immediately before use) of the coating liquid used for manufacturing the gas barrier packaging materials described in PTLs 1 and 2 is insufficient in stability and is prone to aggregate. Thus, there is still room for improvement from a perspective of storage.

The present invention has been made in view of such problems and has an object to provide a gas barrier packaging material precursor and a gas barrier packaging material that can be manufactured without using a special coater having two coating units or a multi-color printer. The present invention also has an object to provide a gas barrier packaging material precursor and a gas barrier packaging material that can be stably produced by using a precursor liquid having good storage stability, can withstand high-temperature and high-pressure treatment, such as retort treatment, can exert remarkably good oxygen gas barrier properties after high-temperature and high-pressure treatment, such as retort treatment, and can also exert good resistance to abuse.

Improvement or Solution to Problem

A gas barrier packaging material precursor according to a first aspect of the present invention includes: a support; an adhesion layer provided on one surface of the support; and a barrier layer and a protective layer formed adjacent to each other on the adhesion layer. In the precursor, the adhesion layer contains a composite of a silicon compound having any one of an isocyanate group, an amino group, and a mercapto group, or a hydrolysate of the compound, an acrylic polyol, and an isocyanate compound; the protective layer is formed of a coating liquid containing a polyvalent metal compound, a polyester resin, and a dispersant; and the protective layer contains the polyvalent metal compound by about 40 to about 90 mass % relative to 100 mass % of the protective layer, and when the barrier layer is separated from the gas barrier packaging material precursor to measure an infrared absorption spectrum of the barrier layer by a transmission method, a ratio ($\alpha/\beta$) of a maximum peak height ($\alpha$) of absorbance in a range of about 1490 to about 1659 $cm^{-1}$ to a maximum peak height ($\beta$) of absorbance in a range of about 1660 to about 1750 $cm^{-1}$ is less than 1.

In the gas barrier packaging material precursor according to the first aspect of the present invention, the acrylic polyol composing the adhesion layer may have a hydroxyl value in a range of 5 to 200 KOH mg/g.

In the gas barrier packaging material precursor according to the first aspect of the present invention, the dispersant may be a sodium salt of a polycarboxylic acid resin.

In the gas barrier packaging material precursor according to the first aspect of the present invention, the coating liquid may contain the dispersant by 2 to 20 mass % relative to 100 mass % of the polyvalent metal compound.

A gas barrier packaging material according to a second aspect of the present invention, in which: the gas barrier packaging material is obtained by having the gas barrier packaging material precursor according to the first aspect subjected to at least one treatment selected from the group consisting of retort treatment, boiling treatment, and humidity conditioning treatment; and when the barrier layer is separated from the gas barrier packaging material precursor to measure an infrared absorption spectrum of the barrier layer by a transmission method, a ratio ($\alpha/\beta$) of a maximum peak height ($\alpha$) of absorbance in a range of about 1490 to about 1659 $cm^{-1}$ to a maximum peak height ($\beta$) of absorbance in a range of about 1660 to about 1750 $cm^{-1}$ is 1 or more.

Advantageous Effects of the Invention

According to the aspects of the present invention set forth above, there are provided a gas barrier packaging material precursor and a gas barrier packaging material which are capable of being manufactured without using a special coater with two coating units or a multi-color printer. In addition, according to the aspects of the present invention set forth above, there are provided a gas barrier packaging material precursor and a gas barrier packaging material which are capable of being more stably produced by using a precursor liquid having good storage stability, and withstand high-temperature and high-pressure treatment, such as retort treatment, and which have improved and even quite good oxygen gas barrier properties after high-temperature and high-pressure treatment, such as retort treatment, and also have good abuse resistance.

DESCRIPTION OF THE REPRESENTATIVE EMBODIMENTS

Embodiments of a gas barrier packaging material precursor and a gas barrier packaging material of the present invention will be described.

The embodiments are specifically described for better understanding of the spirit of the invention and should not be construed as limiting the present invention unless otherwise specified.

[Gas Barrier Packaging Material Precursor]

Figure 2:
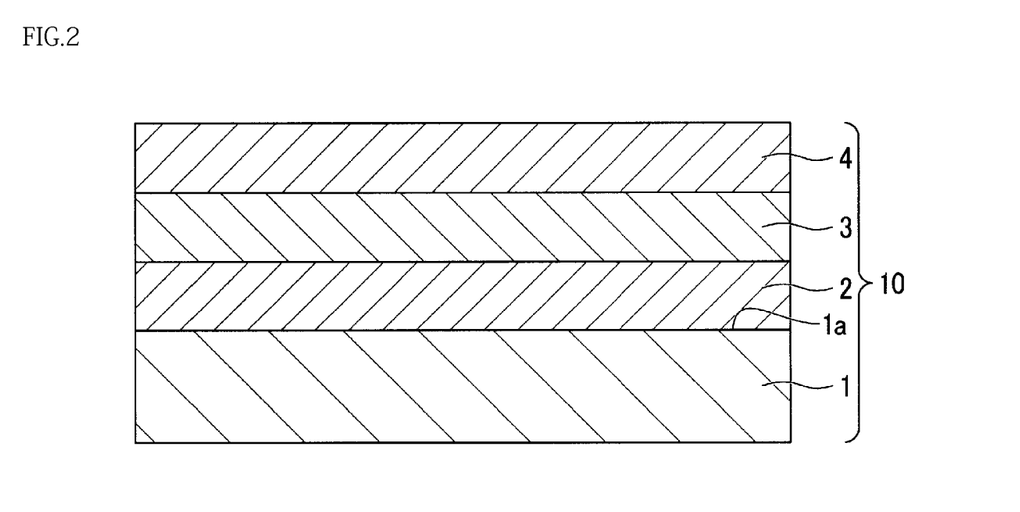
FIG. 2 is a schematic cross-sectional view illustrating a laminated structure of a gas barrier packaging material precursor according to an embodiment of the present invention.

As illustrated in FIG. 2, a gas barrier packaging material precursor 10 according to the present embodiment is provided with a support 1, an adhesion layer 2 provided on one surface of the support 1, and a barrier layer 3 and a protective layer 4 formed adjacent to each other on the adhesion layer 2. The adhesion layer 2 contains a composite of a silicon compound having any one of an isocyanate group, an amino group and a mercapto group or a hydrolysate of the silicon compound, acrylic polyol, and an isocyanate compound. The protective layer 4 is formed of a coating liquid containing a polyvalent metal compound, a polyester resin, and a dispersant. The protective layer 4 contains about 40 to about 90 mass % of the polyvalent metal compound relative to 100 mass % of the protective layer 4. When the barrier layer 3 is separated from the adhesive layer 2 and the protective layer 4 for measurement of an infrared absorption spectrum of the barrier layer by means of a transmission method, a ratio ($\alpha/\beta$) of a maximum peak height ($\alpha$) of absorbance in a range of about 1490 to about 1659 $cm^{-1}$ to a maximum peak height ($\beta$) of absorbance in a range of about 1660 to about 1750 $cm^{-1}$ is less than 1.

Figure 3:
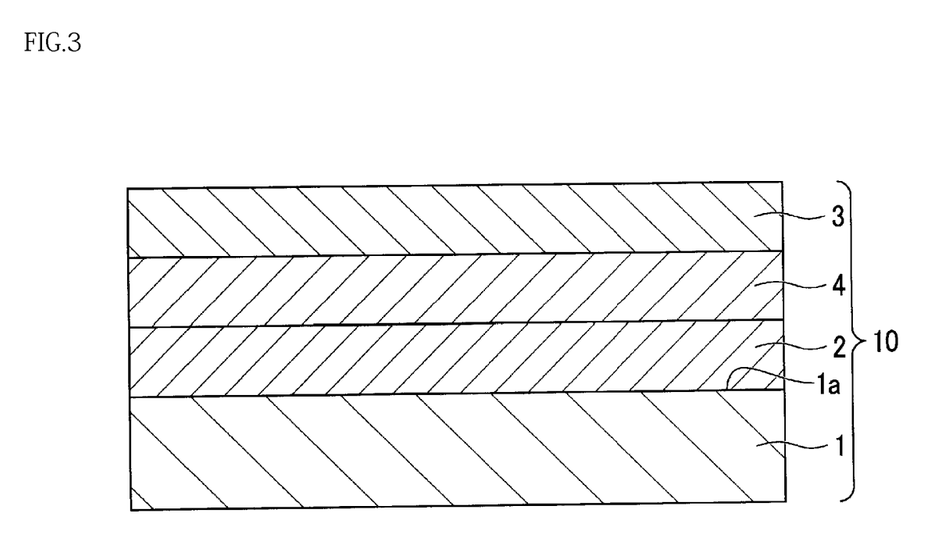
FIG. 3 is a schematic cross-sectional view illustrating a laminated structure of a gas barrier packaging material precursor according to an embodiment of the present invention.

In the gas barrier packaging material precursor 10 according to the present embodiment, when it is described that the barrier layer 3 and the protective layer 4 are formed adjacent to each other on the adhesion layer 2 provided on one surface 1a of the support 1, it means the structures illustrated in FIGS. 2 and 3. That is, as illustrated in FIG. 2, the gas barrier packaging material precursor 10 according to the present embodiment has a laminated structure in which the adhesion layer 2, the barrier layer 3, and the protective layer 4 are formed in this order on a surface 1a of the support 1. Alternatively, as illustrated in FIG. 3, the gas barrier packaging material precursor 10 according to the present embodiment has a laminated structure in which the adhesion layer 2, the protective layer 4, and the barrier layer 3 are formed in this order on the surface 1a of the support 1.

[Support]

The form of the support is not particularly limited but may be provided the form, for example, of a film, sheet, bottle, cup, tray, tank, tube, or the like. In the present embodiment, from the perspective of laminating a barrier layer and the like, a film or a sheet is favorable.

The thickness of the support depends on the usage and the like, but is preferably in a range of 5 µm to 5 cm.

In the usage for a film or a sheet, the support preferably has a thickness in a range of 5 µm to 800 µm and more preferably in a range of 5 µm to 500 µm.

The support, when having a thickness of the above range, will have good workability and productivity in each usage.

Examples of a material for the support can include plastics, papers, rubbers, and the like. Of these materials, plastics are favorable, from the perspective of adhesion between the support and the adhesion layer.

As examples of a material for the plastics, mention can be made of polyolefin polymers, such as low density polyethylene, high density polyethylene, linear low density polyethylene, polypropylene, poly4-methylpentene, annular polyolefins, copolymers of the polyolefin polymers, and acid modifications of the polyolefin polymers; vinyl acetate copolymers, such as polyvinyl acetate, ethylene-vinyl acetate copolymer, saponified ethylene-vinyl acetate copolymer, and polyvinyl alcohol; polyester polymers, such as polyethylene terephthalate, polybutylene terephthalate, polyethylene naphthalate, poly□-caprolactone, polyhydroxy butylate, polyhydroxy valerate, and copolymers of the polyester polymers; polyamide polymers, such as nylon 6, nylon 66, nylon 12, nylon 6-nylon 66 copolymer, nylon 6-nylon 12 copolymer, meta-xyleneadipamide-nylon 6 copolymer, and copolymers of the polyamide polymers; polyether polymers, such as polyethylene glycol, polyether sulfone, polyphenylene sulfide, and polyphenylene oxide; chlorinated polymers or fluorinated polymers, such as polyvinyl chloride, polyvinylidene chloride, polyvinyl fluoride, polyvinylidene fluoride, and copolymers of the chlorinated polymers or the fluorinated polymers; acrylic polymers, such as polymethylacrylate, polyethylacryalte, polymethylmethacrylate, polyethylmethacrylate, polyacrylonitrile, and copolymers of the acrylic polymer; polyimide polymers, and copolymers of the polyimide polymers; resins, such as alkyd resins, melamine resins, acrylic resins, nitrocelluloses, urethane resins, unsaturated polyester resins, phenol resins, amino resins, fluororesins, and epoxy resins used for coating materials; natural polymeric compounds, such as cellulose, starch, pullulan, chitin, chitosan, glucomannan, agarose, gelatin and mixtures of such materials.

From the perspective of adhesion between the support and the adhesion layer, such a support may have a surface subjected to surface activation treatment, such as corona treatment, flame treatment, and plasma treatment.

[Adhesion Layer]

The adhesion layer is formed of a coating liquid A containing a composite of a silicon compound (1) having any one of an isocyanate group, an amino group and a mercapto group, or a hydrolysate of the silicon compound, an acrylic polyol, and an isocyanate compound. The adhesion layer is preferably formed by coating one surface of the support with the coating liquid, followed by drying.

The thickness of the adhesion layer is not particularly limited as far as a coating film with a uniform thickness can be formed, but is preferably in a range of 0.01 µm to 2 µm and more preferably in a range of 0.05 µm to 0.5 µm.

When the thickness of the adhesion layer is 0.01 µm or more, a coating film with a uniform thickness is easily obtained, which is good from the perspective of adhesiveness with the support. When the thickness of the adhesion layer is 2 µm or less, the coating film is able to retain pliability (flexibility) and the coating film is unlikely to have cracks due to external factors.

<Silicon Compound (1)>

For example, as the silicon compound (1), silane coupling agents, such as vinyltrimethoxysilane, γ-chloropropylmethyldimethoxysilane, γ-chloropropyltrimethoxysilane, glycidoxypropyltrimethoxysilane, γ-methacryloxypropyltrimethoxysilane, and γ-methacryloxypropylmethyldimethoxysilane, or hydrolysates of the silane coupling agents are used singly or in combination of two or more.

Particularly preferable ones among these silane coupling agents are those which have a functional group that reacts with a hydroxyl group of an acrylic polyol or an isocyanate group of an isocyanate compound.

As such silane coupling agents, mention can be made of: those which contain an isocyanate group, such as γ-isocyanatepropyltriethoxysilane or γ-isocyanatepropyltrimethoxysilane; those which contain a mercapto group, such as γ-mercaptopropyltriethoxysilane; and those which contain an amino group, such as γ-aminopropyltriethoxysilane, γ-aminopropyltrimethoxysilane, N-β-(aminoethyl)-γ-aminopropyltriethoxysilane, or γ-phenylaminopropyltrimethoxysilane.

As other silane coupling agents, mention can be made of those which contain an epoxy group, such as γ-glycidoxypropyltrimethoxysilane or β-(3,4-epoxycyclohexyl)ethyltrimethoxysilane, or silane coupling agents, such as vinyltrimethoxysilane and vinyltris(β-methoxyethoxy)silane, to which alcohols and the like are added, with a further addition of a hydroxyl group and the like.

These silane coupling agents are used singly or in combination of two or more.

In each silane coupling agent mentioned above, an organic functional group at an end (first end) of the silane coupling agent interacts with the acrylic polyol and the isocyanate compound that form the composite and thus a strong primer layer is formed. Further, an alkoxy group or a silanol group produced by hydrolysis of the alkoxy group at the other end (second end) of the silane coupling agent strongly interacts with metal in an inorganic oxide or a highly polar hydroxyl group on a surface of the inorganic oxide, and the like, to produce adhesiveness with the inorganic oxide. Therefore, the desired physical properties can be obtained.

In addition, by using, as the above silane coupling agent, a silane coupling agent that contains functional groups reacting with a hydroxyl group of an acrylic polyol or an isocyanate group of an isocyanate compound, a strong primer layer can be formed. This is because the functional groups achieve a covalent bonding.

Accordingly, the primer layer may be formed using a reaction product obtained by a hydrolysis reaction of the silane coupling agent with metal alkoxide.

The alkoxy group of the above silane coupling agent may be substituted by a chloro group, an acetoxy group, or the like. When a silane coupling agent is obtained in which a silanol group is formed by hydrolysis of an alkoxy group, a chloro group, an acetoxy group, or the like, such a silane coupling agent can be used for the composite in the present embodiment.

<Acrylic Polyol>

The acrylic polyol has a structure with two or more hydroxyl groups at a polymer terminal. The acrylic polyol reacts with an isocyanate group of an isocyanate compound added later.

Preferable acrylic polyols include polyols obtained by polymerizing acrylic acid derivative monomers, or alternatively polyols obtained by copolymerizing acrylic acid derivative monomers and other monomers.

Of the acrylic polyols, preferably used ones are acrylic polyols in which an acrylic acid derivative monomer, such as ethyl methacrylate, hydroxyethyl methacrylate, hydroxypropyl methacrylate, or hydroxybutyl methacrylate, is polymerized, and acrylic polyols to which an acrylic acid derivative and other monomers, such as styrene, are added, followed by copolymerization.

Taking account of the reactivity of the acrylic polyol and the isocyanate compound and the compatibility of the acrylic polyol and a silane coupling agent, the acrylic polyol preferably has a hydroxyl value in a range of 5 to 200 KOH mg/g.

When the acrylic polyol has a hydroxyl value of less than 5 KOH mg/g, the reactivity of the acrylic polyol and the isocyanate is poor and thus a sufficient strength is not necessarily obtained. In contrast, when the acrylic polyol has a hydroxyl value of more than 200 KOH mg/g, the reactivity of the acrylic polyol and the isocyanate is excessively high, causing easy curing of the coating liquid A and lack of coating liquid stability.

The formulation ratio of the acrylic polyol and the silane coupling agent by mass ratio is preferably in a range of 1/1 to 1000/1 and more preferably, 2/1 to 100/1.

When the formulation ratio of the acrylic polyol and the silane coupling agent is less than 1/1 by mass ratio, the hardness of the adhesion layer increases, while the adhesion strength between the adhesion layer and the barrier layer or the adhesion strength between the adhesion layer and the protective layer decreases. In contrast, when the formulation ratio of the acrylic polyol and the silane coupling agent is more than 1000/1 by mass ratio, the tackiness of the adhesion layer increases and blocking tends to occur.

A solvent for dissolving and diluting the acrylic polyol is not particularly limited as long as the solvent is capable of dissolving and diluting the acrylic polyol. Solvents that can be used include, for example, esters, such as ethyl acetate and butyl acetate; alcohols, such as methanol, ethanol, and isopropyl alcohol; ketones, such as methyl ethyl ketone; and aromatic hydrocarbons, such as toluene and xylene.

These solvents are formulated using one solvent or two or more arbitrarily selected solvents.

However, when an aqueous solution of hydrochloric acid or the like is used for hydrolyzing the silane coupling agent, a solvent in which an alcohol, such as isopropyl alcohol, and ethyl acetate as a polar solvent are arbitrarily mixed is preferably used as a cosolvent.

<Isocyanate Compound>

The isocyanate compound is added to the acrylic polyol to enhance adhesiveness with a plastic substrate or an inorganic oxide by urethane bonding that is formed by reaction with a polyol, such as acrylic polyol. The isocyanate compound mainly acts as a crosslinker or a curing agent.

Isocyanate compounds functioning as a crosslinker or a curing agent include, for example, monomers, such as aromatic tolylene diisocyanate (TDI) and diphenylmethane diisocyanate (MDI), and aliphatic xylylene diisocyanate (XDI), hexamethylene diisocyanate (HMDI), and isophorone diisocyanate (IPDI), and polymers and derivatives of these materials. These materials are used singly or in combination of two or more.

The formulation ratio of the acrylic polyol and the isocyanate compound is not particularly limited. An excessively low ratio of the isocyanate compound in the formulation ratio may cause incomplete curing, whereas an excessively high ratio of the isocyanate compound may cause blocking or the like, leading to a defective process.

Therefore, it is preferable that the formulation ratio of the acrylic polyol and the isocyanate compound is adjusted such that an NCO group derived from the isocyanate compound will be 50 times or less of an OH group derived from the acrylic polyol, and it is particularly preferable that the formulation ratio is adjusted such that an NCO group derived from the isocyanate compound will be chemically equivalent to an H group derived from the acrylic polyol.

A method of mixing the acrylic polyol and the isocyanate compound is not particularly limited and a known method may be used.

<Coating Liquid A of Adhesion Layer>

The adhesion layer is formed of the coating liquid A.

The coating liquid A contains a composite of a silicon compound (1) having any one of an isocyanate group, an amino group and a mercapto group or a hydrolysate thereof, an acrylic polyol, and an isocyanate compound.

The solvent used for the coating liquid A is not particularly limited, and thus solvents that can be used for the coating liquid A include, for example, organic solvents, such as water, methyl alcohol, ethyl alcohol, isopropyl alcohol, n-propyl alcohol, n-butyl alcohol, n-pentyl alcohol, dimethyl sulfoxide, dimethyl formamide, dimethyl acetamide, toluene, hexane, heptane, cyclohexane, acetone, methyl ethyl ketone, diethyl ether, dioxane, tetrahydrofuran, ethyl acetate, and butyl acetate.

From the perspective of suitability for coating, the solid content concentration of the coating liquid A is preferably in a range of 0.5 to 50 mass % relative to 100 mass % of the coating liquid A.

[Barrier Layer]

The barrier layer preferably contains a polycarboxylic acid polymer.

The thickness of the barrier layer is not particularly limited as long as a uniform coating film can be formed. The thickness is preferably in a range of 0.01 µm to 2 µm and more preferably in a range of 0.05 µm to 1.0 µm.

When the thickness of the barrier layer is 0.01 µm or more, a uniform coating film is easily obtained, which is good from the perspective of adhesiveness with the adhesion layer. When the thickness of the barrier layer is 2 µm or less, an ionic crosslink is immediately formed through a method described later and sufficient oxygen gas barrier properties are obtained.

The polycarboxylic acid polymer refers to a polymer having two or more carboxyl groups in a molecule. Such polycarboxylic acid polymers include, for example, (co)polymers of ethylenic unsaturated carboxylic acids; copolymers obtained from ethylenic unsaturated carboxylic acids and other ethylenic unsaturated monomers; and acidic polysaccharides having a carboxyl group in a molecule of alginic acid, carboxymethyl cellulose, pectin, or the like.

These polycarboxylic acid polymers are used singly or in combination or two or more.

As the ethylenic unsaturated carboxylic acids, mention can be made of acrylic acid, methyacrylic acid, itaconic acid, maleic acid, fumaric acid, crotonic acid, and the like.

As the ethylenic unsaturated monomers copolymerizable with an ethylenic unsaturated carboxylic acid, mention can be made of saturated carboxylic acid vinyl esters, such as ethylene, propylene, and vinyl acetate; alkyl acrylates; alkyl methacrylates; alkyl itaconates; vinyl chloride; vinylidene chloride; styrene; acrylamide; and acrylonitrile.

Of the polycarboxylic acid polymers, from the perspective of the gas barrier properties of the gas barrier packaging material precursor to be obtained, the polycarboxylic acid polymers are preferably those which contain a constituent derived from at least one polymerizable monomer selected from the group consisting of acrylic acid, methyacrylic acid, itaconic acid, maleic acid, fumaric acid, and crotonic acid, or mixtures of such polymers.

It is particularly preferable that the polymers are those which contain a constituent derived from at least one polymerizable monomer selected from the group consisting of acrylic acid, methyacrylic acid, itaconic acid, and maleic acid, or mixtures of such polymers.

As the polymers, homopolymers or copolymers may be used.

In the polymers mentioned above, the constituent derived from at least one polymerizable monomer selected from the group consisting of acrylic acid, methyacrylic acid, itaconic acid, and maleic acid is preferably 80 mol % or more and more preferably 90 mol % or more (note that the entire constituents are taken to be 100 mol %).

When a constituent other than the above constituents is contained in the polymers mentioned above, the constituent can be an ethylenic unsaturated monomer or the like copolymerizable with ethylenic unsaturated carboxylic acid.

The polycarboxylic acid polymers preferably have a number average molecular weight in a range of 2,000 to 10,000,000.

When a polycarboxylic acid polymer has a number average molecular weight of 2,000 or more, a gas barrier packaging material precursor to be obtained has good waterproofness, and thus the gas barrier properties and the transparency are not deteriorated due to moisture, or whitening does not occur. When a polycarboxylic acid polymer has a number average molecular weight of 10,000,000 or less, viscosity increases when an adhesion layer is formed by coating and the coating properties are not easily lost.

Further, from the perspective of the waterproofness of the gas barrier packaging material precursor to be obtained, such a polycarboxylic acid polymer preferably has a number average molecular weight in a range of 5,000 to 1,000,000.

The number average molecular weight of the polycarboxylic acid polymer is obtained by using gel permeation chromatography (GPC) and expressed in terms of polystyrene.

A part of the carboxyl group contained in the polycarboxylic acid polymer may be neutralized by a basic compound in advance.

Preferably, the basic compound is at least one selected from the group consisting of a polyvalent metal compound, a monovalent metal compound, and ammonia.

By neutralizing a part of the carboxyl group contained in the polycarboxylic acid polymer in advance, the waterproofness of the barrier layer can be improved. Thus, the barrier layer is prevented from being expanded when a protective layer made of a water-based coating liquid described later is laminated.

From the perspective of the stability of the precursor coating liquid of the barrier layer, the degree of neutralization of the carboxyl group is preferably 30 mol % or less and more preferably 25 mol % or less.

The barrier layer contains at least one silicon compound (2) selected from the group consisting of a silane coupling agent represented by a general formula (1) below, a hydrolysate thereof, and a condensate of these materials.

$$Si(OR)_3Z \quad (1)$$

(In the formula, R denotes an alkyl group having 1 to 6 carbon atoms, Z denotes an organic group containing a glycidyloxy group or an amino group, and each R may be unchanged or may be different.)

In the present embodiment, the "at least one silicon compound (2) selected from the group consisting of a silane coupling agent represented by the general formula (1), a hydrolysate thereof, and a condensate of these materials" is also simply referred to as a "silicon compound (2)". A condensate of a hydrolysate of the silane coupling agent represented by the general formula (1) is also simply referred to as a hydrolysis condensate.

The silicon compound (2) may be the silane coupling agent represented by the general formula (1), or may be a hydrolysate obtained by hydrolysis of the silane coupling agent, or may be a condensate of these materials.

The silicon compound (2) that can be used includes a compound obtained by hydrolysis and condensation reactions of the silane coupling agent represented by the general formula (1) using, for example, a sol-gel method.

Normally, hydrolysis easily occurs and a condensation reaction easily occurs in the presence of acid or alkali, in the silane coupling agent represented by the general formula (1). Therefore, it is rare to find only the silane coupling agent represented by the general formula (1), only a hydrolysate thereof, or only a condensate of these materials. That is, normally in the silicon compound (2), the silane coupling agent represented by the general formula (1), a hydrolysate thereof, and a condensate of these materials are admixed with each other. The hydrolysate includes a partial hydrolysate and a complete hydrolysate.

Preferably, the silicon compound (2) at least contains a hydrolysis condensate.

As a method used for producing the hydrolysis condensate, the silane coupling agent represented by the general formula (1) may be directly mixed with a liquid that contains the above polycarboxylic acid polymer and water, or water may be added to the silane coupling agent to perform hydrolysis, followed by condensation reaction, so that the hydrolysis condensate can be obtained before mixing the silane coupling agent with the polycarboxylic acid polymer.

As the silane coupling agent represented by the general formula (1), mention can be made of γ-glycidoxypropyltrimethoxysilane, γ-glycidoxypropyltriethoxysilane, γ-aminopropyltrimethoxysilane, and γ-aminopropyltriethoxysilane. Of these materials, γ-glycidoxypropyltrimethoxysilane and γ-aminopropyltrimethoxysilane are preferable.

These silane coupling agents are used singly or in combination of two or more.

The barrier layer contains the silicon compound (2). With only a small content of the silicon compound (2), the barrier layer exhibits good effect. Therefore, from the perspective of cost, the barrier layer preferably contains a small amount of the silicon compound (2).

When a silicon compound contains a hydrolysis condensate as the silicon compound (2), at least a part of the alkoxy group (OR) contained in the silane coupling agent represented by the general formula (1) is substituted by a hydroxyl group to form a hydrolysate. Further, condensation of the hydrolysate can form a compound in which silicon atoms (Si) are bonded via oxygen. Such condensation is repeated to obtain a hydrolysis condensate.

The amount of the silicon compound (2) contained in the barrier layer, when expressed in terms of a mass of the polycarboxylic acid polymer to a mass of the silicon compound (2) (polycarboxylic acid polymer : silicon compound (2)), is preferably in a range of 99.5:0.5 to 80.0:20.0. However, the mass of the silicon compound (2) other than the silane coupling agent represented by the general formula (1) is expressed in terms of the silane coupling agent represented by the general formula (1). Specifically, in the silicon compound (2), the silane coupling agent represented by the general formula (1), the hydrolysate thereof, and a condensate of these materials are admixed with each other. In the present embodiment, the mass of the silicon compound (2) corresponds to a value converted to the silane coupling agent represented by the general formula (1), i.e. an amount used of of the silane coupling agent represented by the general formula (1).

When γ-glycidoxypropyltrimethoxysilane or γ-glycidoxypropyltriethoxysilane is used as the silane coupling agent represented by the general formula (1), the ratio of a mass of the polycarboxylic acid polymer to a mass of the silicon compound (2) is preferably in a range of 99.5:0.5 to 90:10 and more preferably in a range of 99:1 to 95:5.

When γ-aminopropyltrimethoxysilane or γ-aminopropyltriethoxysilane is used as the silane coupling agent represented by the general formula (1), the ratio of a mass of the polycarboxylic acid polymer to a mass of the silicon compound (2) is preferably in a range of 99:1 to 80:20 and more preferably in a range of 95:5 to 80:20.

When the ratio by mass of the polycarboxylic acid polymer to the silicon compound (2) is within the above range, a barrier layer having good gas barrier properties is obtained and the barrier layer is efficiently prevented from being expanded when a protective layer made of a water-based coating liquid is laminated.

The barrier layer contains the silicon compound (2) so that the ratio by mass of the polycarboxylic acid polymer to the silicon compound (2) falls within the above range. Thus, the barrier layer will have a uniform thickness without phase separation.

Further, the barrier layer, which contains the silicon compound (2), is resistant to acid.

<Zinc Compound>

The barrier layer may contain a zinc compound, which is a polyvalent metal compound.

A polycarboxylic acid polymer is mixed with a zinc compound to neutralize with zinc in advance a part of the carboxyl group contained in the polycarboxylic acid polymer, thereby improving waterproofness of the barrier layer. Thus, the barrier layer is prevented from being expanded when a protective layer made of a water-based coating liquid described later is laminated.

From the perspective of stability of a coating liquid B to form the barrier layer, the degree of neutralization of the carboxyl group is preferably 30 mol % or less and more preferably 25 mol % or less.

Zinc compounds that can be used include, for example, simple substances of zinc, oxides, hydroxides, carbonates, organic acid salts (e.g., acetate), or alternatively, inorganic acid salts, or ammonium complexes or secondary to quaternary amine complexes, or alternatively, carbonates or organic acid salts of these materials. Of these zinc compounds, zinc oxide and zinc acetate are more preferable, and zinc oxide is particularly preferably used, from the perspective of industrial productivity.

<Additives>

The barrier layer may contain various additives.

Additives that can be used include plasticizers, resins, dispersants, surfactants, softening agents, stabilizers, anti-blocking agents, film forming agents, tackifiers, oxygen absorbers, and the like.

As the plasticizer, one from known plasticizers can be appropriately selected for use, for example. As specific examples of such a plasticizer, mention can be made of ethylene glycol, trimethylene glycol, propylene glycol, tetramethylene glycol, 1,3-butanediol, 2,3-butanediol, pentamethylene glycol, hexamethylene glycol, diethylene glycol, triethylene glycol, polyethylene glycol, polyvinyl alcohol, ethylene-vinyl alcohol copolymer, polyethylene oxide, sorbitol, mannitol, dulcitol, erythritol, glycerin, lactic acids, fatty acids, starch, phthalic acid ester, and the like. These plasticizers are used singly or in combination of two or more as necessary.

Of these plasticizers, polyethylene glycol, polyvinyl alcohol, ethylene-vinyl alcohol copolymer, glycerin, or starch are preferable, from the perspective of stretchability and gas barrier properties. When such a plasticizer is contained in the barrier layer, the stretchability is improved and thus the resistance to abuse of the barrier layer is improved even more.

The amount of an additive is preferably in a range of 70:30 to 99.9:0.1 and more preferably in a range of 80:20 to 98:2 that is a ratio by mass of the polycarboxylic acid polymer to the additive (polycarboxylic acid polymer: additive).

<Coating Liquid B of Barrier Layer>

The barrier layer is formed of a coating liquid B.

The coating liquid B is composed of the above polycarboxylic acid polymer and a silicon compound (2). The silicon compound (2) is at least one selected from the group consisting of the silane coupling agent represented by the general formula (1), a hydrolysate thereof, and a condensate of these materials, and may contain an above-mentioned additive as necessary.

A solvent used for the coating liquid B is not particularly limited. Solvent that can be used for the coating liquid B include, for example, water, mixed solvents of water and an organic solvent, and the like. Of these solvents, water is most preferable, from the perspective of solubility of the polycarboxylic acid polymer.

As such water, purified water is preferably used including, for example, distilled water, deionized water, and the like.

Organic solvents, such as alcohol, are preferable from the viewpoint of improving the solubility of the silane coupling agent represented by the general formula (1) and the coating properties of the coating liquid B.

As such an organic solvent, at least one organic solvent selected from the group consisting of lower alcohols having 1 to 5 carbon atoms and lower ketones having 3 to 5 carbon atoms, or the like is preferably used.

Examples of organic solvents that can be used include, for example, methanol, ethanol, propanol, 2-propanol, isopropanol, n-butanol, isobutanol, sec-butanol, tert-butanol, acetone, methyl ethyl ketone, and the like.

As the mixed solvent of water and an organic solvent, a mixed solvent using an above-mentioned water and organic solvent is preferable, and a mixed solvent of water and a lower alcohol having 1 to 5 carbon atoms is more preferable.

As such a mixed solvent, a solvent that contains water by 20 to 95 mass % and an organic solvent by 80 to 5 mass % is typically used (where the total of the water and the organic solvent is taken to be 100 mass %).

[Protective Layer]

The protective layer is formed of a coating liquid containing a polyvalent metal compound, a polyester resin, and a dispersant.

The coating liquid may contain a curing agent.

The protective layer is preferably formed by coating the coating liquid, followed by drying.

The polyvalent metal compound refers to a compound of metal having a metal ion with a valence of 2 or more (polyvalent metal).

Examples of polyvalent metals that can be used include, for example, alkaline earth metals, such as magnesium and calcium; transition metals, such as titanium, zirconium, chromium, manganese, iron, nickel, copper, and zinc; and aluminum.

Specific examples of polyvalent metal compounds that can be used include, for example, the oxides, hydroxides, and carbonates as the polyvalent metals mentioned above. Of these polyvalent metal compounds, zinc oxide is preferable.

The average particle size of the zinc oxide particles is not particularly limited. From the perspective of barrier properties and coating suitability, the average particle size is preferably 5 µm or less, more preferably 1 µm or less, and particularly preferably 0.1 µm or less.

The protective layer contains of a polyvalent metal compound by about 40 to about 90 mass % relative to 100 mass % of the protective layer, preferably by 50 to 90 wt %, and more preferably by 60 to 90 wt %.

By setting a polyvalent metal compound content in the protective layer within the above range, gas barrier properties of the protective layer and adhesiveness with the adhesion layer or the barrier layer thereof can be improved.

<Polyester Resin>

The polyester resin is not particularly limited. From the perspective of adhesiveness with the adhesion layer or the barrier layer, a preferable resin is one obtained by reaction of a resin made of polyester polyol with a curing agent made of diisocyanate.

The polyester resin is preferably contained by 5 to 30 mass % relative to 100 mass % of the protective layer.

<Dispersant>

The coating liquid used for forming the protective layer preferably contains, as a dispersant, a sodium salt of a polycarboxylic acid resin.

The polycarboxylic acid resin refers to a resin having two or more carboxyl groups in a molecule.

Sodium salts of such polycarboxylic acid resins include those of copolymers obtained by copolymerizing the sodium salts of homopolymers of unsaturated carboxylic acids, such as acrylic, methyacrylic, itaconic, maleic, fumaric and crotonic acids, with at least one of these unsaturated carboxylic acids.

Alternatively, copolymers obtained by copolymerizing the homopolymers of sodium salts of unsaturated carboxylic acids, with at least one of the sodium salts of unsaturated carboxylic acids can be used. That is, the sodium salt of the polycarboxylic acid resin used for the present embodiment may be obtained by neutralizing, with sodium, a carboxyl group possessed by the polycarboxylic acid which is obtained by (co)polymerizing unsaturated carboxylic acids.

Alternatively, the sodium salt of the polycarboxylic acid resin may be obtained by (co)polymerizing the sodium salts of unsaturated carboxylic acids.

The sodium salt of a copolymer obtained through copolymerization using at least one of unsaturated carboxylic acids is preferably obtained through copolymerization using two or more unsaturated carboxylic acids.

The copolymer obtained through copolymerization using at least one sodium salt of an unsaturated carboxylic acid is preferably a copolymer obtained through copolymerization using two or more sodium salts of unsaturated carboxylic acids.

When the copolymer is synthesized, monomers other than unsaturated carboxylic acids or sodium salts of unsaturated carboxylic acids may be copolymerized.

From the perspective of the dispersibility of zinc oxide, the sodium salt of the polycarboxylic acid resin is preferably at least one sodium salt of polycarboxylic acid selected from the group consisting of a polyacrylic acid sodium salt, a polymaleic acid sodium salt, and a sodium salt of an acrylic acid-maleic acid copolymer.

<Coating Liquid C of Protective Layer>

The protective layer is formed of a coating liquid C. The coating liquid C is prepared by adding a curing agent to a precursor liquid C-2.

The precursor liquid C-2 contains a polyester resin, zinc oxide, and a dispersant.

A solvent used for the precursor liquid C-2 is not particularly limited. Solvents that can be used for the precursor liquid C-2 include, for example, water; and organic solvents, such as methyl alcohol, ethyl alcohol, isopropyl alcohol, n-propyl alcohol, n-butyl alcohol, n-pentyl alcohol, dimethyl sulfoxide, dimethyl formamide, dimethyl acetamide, toluene, hexane, heptane, cyclohexane, acetone, methyl ethyl ketone, diethyl ether, dioxane, tetrahydrofuran, ethyl acetate, and butyl acetate.

From the perspective of coating suitability, the coating liquid C preferably has a solid content concentration of 1 to 50 mass %, and more preferably 2 to 30 mass %.

In the gas barrier packaging material precursor according to the present embodiment, when the barrier layer is separated for measurement of an infrared absorption spectrum of the barrier layer by means of a transmission method, a ratio ($\alpha/\beta$) of a maximum peak height ($\alpha$) of absorbance in a range of about 1490 to about 1659 cm$^{-1}$ to a maximum peak height ($\beta$) of absorbance in a range of about 1660 to about 1750 cm$^{-1}$ is less than 1.

For example, the infrared absorption spectrum is measured by the following method.

Firstly, the barrier layer is separated from the gas barrier packaging material precursor. The separation method can be a method with which the barrier layer is directly separated from the protective layer, or can be other methods.

Then, the infrared absorption spectrum of the separated barrier layer is measured by means of a transmission method using FT-JR1710 manufactured by Perkin-Elmer.

In the infrared absorption spectrum thus obtained, a ratio ($\alpha/\beta$) of a maximum peak height ($\alpha$) in absorbance peaks appearing in a range of about 1490 to about 1659 cm$^{-1}$ to a maximum peak height ($\beta$) in absorbance peaks appearing in a range of about 1660 to about 1750 cm$^{-1}$ is calculated.

When the polycarboxylic acid polymer used for the barrier layer forms an ionic crosslink, an absorption maximum derived from C=O stretching vibration of the salt (—COO—) of the carboxyl group is shown in the vicinity of 1560 cm$^{-1}$, while the maximum peak height ($\alpha$) of absorbance in a range of about 1490 to about 1659 cm$^{-1}$ serves as a measure of indicating the extent to which the ionic crosslink has been formed.

On the other hand, a carboxyl group before forming an ionic crosslink shows an absorption maximum derived from C=O stretching vibration of a carboxyl group (—COOH) in the vicinity of 1720 cm$^{-1}$, while the maximum peak height (β) of absorbance in a range of about 1660 to about 1750 cm$^{-1}$ serves as a measure of indicating an abundance of carboxyl groups that have not formed an ionic crosslink.

In the present embodiment, the ratio (α/β) of infrared absorption spectrum peaks of the barrier layer is less than 1. When the ratio (α/β) of infrared absorption spectrum peaks is less than 1, most of the carboxyl groups of the polycarboxylic acid polymer in the barrier layer do not form an ionic crosslink and have flexibility. If abuse (rough use), such as stretching, is applied in this state, no defect is caused in the barrier layer.

The sodium salt of the polycarboxylic acid resin is considered to have a high adsorption capacity for a polyvalent metal compound, in particular, zinc oxide, due to the alkyl groups, and easily generate an electrical repulsive force by electrolytic dissociation after adsorption to a surface of a polyvalent metal compound, in particular, zinc oxide, due to the carboxyl groups. Therefore, the sodium salt of the polycarboxylic acid resin contributes to preferably dispersing zinc oxide.

According to the present embodiment, use of the sodium salt of the polycarboxylic acid resin as a dispersant can prevent aggregation of a polyvalent metal compound, such as zinc oxide, or occurrence of precipitate in the precursor liquid C-2 before addition of the curing agent to the coating liquid C of the protective layer. As a result, a sufficiently stable coating liquid is obtained.

By giving sufficient stability to the precursor liquid C-2, a favorable dispersed state of the precursor liquid C-2 is maintained without the necessity of having low temperature storage equipment, such as a refrigerator, or equipment to be used immediately after preparation of the coating liquid.

Further, since the precursor liquid C-2 has a low probability of aggregation, the coating liquid C using the precursor liquid C-2 enables formation of the protective layer in a uniform thickness, thereby preventing the increase of haze in the gas barrier packaging material precursor. In addition, since the protective layer is uniformly formed, the ionic crosslinking of the polycarboxylic acid polymer is also uniformly formed, and sufficient gas barrier properties are obtained for the protective layer.

The coating liquid C preferably contains 2 to 20 mass % of dispersant relative to 100 mass % of polyvalent metal compound.

With the content of the dispersant in the above range, the coating liquid C unlikely to aggregate or precipitate is obtained.

The coating liquid C is prepared by adding a curing agent to the precursor liquid C-2 immediately before use. The protective layer can be formed by coating the coating liquid C, followed by drying.

The curing agent is not particularly limited, but an isocyanate compound is favorably used as the curing agent.

<Coating>

A method of coating the coating liquid A of the adhesion layer, the coating liquid B of the barrier layer, and the coating liquid C of the protective layer is not particularly limited. Examples of the coating method include casting, dipping, roll coating, gravure coating, screen printing, reverse coating, spray coating, kit coating, die coating, metaling bar coating, chamber doctor combined coating, curtain coating, and the like.

Coating and drying of the coating liquid A of the adhesion layer, the coating liquid B of the barrier layer, and the coating liquid C of the protective layer is successively performed. In this case, the subsequent coating that follows drying of each coating liquid may be performed after going through a take-up process, or without going through a take-up process.

<Drying>

The coating liquid A of the adhesion layer, the coating liquid B of the barrier layer, and the coating liquid C of the protective layer are dried after being coated to remove the solvents, thereby forming the adhesion layer, the barrier layer, and the protective layer, respectively.

The drying method is not particularly limited. Examples of the drying method include hot air drying, hot roll contact drying, infrared heating, microwave heating, and the like.

Of these drying methods, a single method may be used, or a combination of methods may be used.

Drying temperature is not particularly limited, but when water or a mixed solvent of water and an organic solvent is used as a solvent, typically, a temperature in a range of 50 to 160° C. is preferable.

As a pressure to be applied in drying, typically, a normal pressure or a reduced pressure is preferable. From the perspective of the simplicity of equipment, a normal pressure is preferable.

<Application (Lamination)>

The gas barrier packaging material precursor of the present embodiment may be provided thereon with a lamination of one other substrate for the purpose of giving strength, sealing properties, easy unsealability when sealed, design properties, light blocking properties, and the like.

The other substrate is appropriately selected according to the purposes, but normally plastic films or papers are preferably used. Such plastic films or papers may be laminated singly, or in combination of two or more.

The form of the substrate is not particularly limited. Examples of the form of the substrate include forms of a film, sheet, bottle, cup, tray, tank, tube, and the like. Of these substrates, a film or a sheet is preferable, from the perspective of laminating the gas barrier packaging material precursor. In addition, a sheet before forming into a cup or a flattened tube is also preferable.

As the method of laminating the gas barrier packaging material precursor of the present embodiment with the other substrate, a method of lamination using an adhesive according to a lamination technique can be used. Specific examples of the lamination technique include dry lamination, wet lamination, extrusion lamination, and the like.

There is no particular limitation in the mode of laminating the gas barrier packaging material precursor of the present embodiment with the other substrate. From the perspective of handleability of a product to be obtained, modes of lamination that can be used include, for example, (α) gas barrier packaging material precursor/polyolefin, (b) gas barrier packaging material precursor/polyolefin (tube shaped)/gas barrier packaging material precursor, (c) gas barrier packaging material precursor/nylon/polyolefin, (d) gas barrier packaging material precursor/polyolefin/paper/polyolefin, (e) polyolefin/gas barrier packaging material precursor/polyolefin, (f) polyolefin/gas barrier packaging material precursor/nylon/polyolefin, (g) polyethylene terephthalate/gas barrier packaging material precursor/nylon/polyolefin, and the like.

These laminates may each be repeatedly laminated.

From the perspective of giving design properties, light blocking properties, moisture prevention properties, and the like, each laminate may be laminated with a printed layer or a deposited layer of metal or a silicon compound.

From the perspective of the barrier properties, it is preferable that a laminated surface of the gas barrier packaging material precursor is not arranged in an outermost layer. When the laminated surface of the gas barrier packaging material precursor is arranged in the outermost layer, the barrier layer and the like are scraped, creating a factor of impairing barrier properties.

The gas barrier packaging material precursor of the present embodiment can provide a gas barrier packaging material having good oxygen barrier properties by being subjected to a heating process, such as retort treatment. In addition, using the coating liquid having good abuse resistance and good stability, a gas barrier packaging material having good productivity is provided.

The gas barrier packaging material precursor of the present embodiment can be produced without using a special coater with two coating units (two-head coater) or a multicolor printer.

The gas barrier packaging material precursor of the present embodiment can provide a gas barrier packaging material for food products, beverages, drugs, pharmaceutical products, precision metal components, such as electronic components, which are easily degraded by the influence of oxygen and the like.

The gas barrier packaging material precursor of the present embodiment can provide a gas barrier packaging material which is preferable as a packaging material for articles needing stable gas barrier performance over a long period of time and needing treatment under hot hydrothermal conditions, such as boiling treatment or retort sterilization treatment.

Further, the gas barrier packaging material precursor of the present embodiment can provide a gas barrier packaging material with no need for low temperature storage equipment, such as a refrigerator, or equipment to be used immediately after coating, when storing the precursor liquid.

[Gas Barrier Packaging Material]

A gas barrier packaging material of the present embodiment is obtained by applying at least one treatment selected from the group consisting of retort treatment, boiling treatment, and humidity conditioning treatment to the gas barrier packaging material precursor of the present embodiment. According to the barrier packaging material of the present embodiment, when the barrier layer is separated for measurement of an infrared absorption spectrum of the barrier layer by a transmission method, a ratio ($\alpha/\beta$) of a maximum peak height ($\alpha$) of absorbance in a range of about 1490 to about 1659 cm$^{-1}$ to a maximum peak height ($\beta$) of absorbance in a range of about 1660 to about 1750 cm$^{-1}$ is 1 or more.

[Retort Treatment]

Retort treatment generally refers to a method of pressure-sterilizing microorganisms, such as mold, yeast, and bacteria, to store food products and the like.

In the present embodiment, retort treatment that can be used is a method of pressure-sterilizing the gas barrier packaging material precursor of the present embodiment for packaging food products or the like, under the conditions of 105 to 140° C., 0.15 to 0.3 MPa, and 10 to 120 minutes.

Retort systems that can be used include steam type systems utilizing heated steam, hot-water type systems utilizing pressurized heated water, and the like, each of which is appropriately used according to the sterilization conditions for food products or the like to be the contents.

[Boiling Treatment]

Boiling treatment refers to a method of sterilizing food products or the like by wet heat for storage thereof.

Method of boiling treatment depends on the contents. Boiling treatments that can be used include a method of sterilizing the gas barrier packaging material precursor of the present embodiment for packaging food products or the like under the conditions of 60 to 100° C., atmospheric pressure, and 10 to 120 minutes.

The boiling treatment is performed using a hot-water vessel. Boiling treatments include batch boiling treatment where the packaging material precursor is immersed in hot water of a given temperature in a vessel and taken out after lapse of a given time, and continuous boiling treatment where the packaging material precursor is passed through hot water in a vessel in a tunnel-like manner for sterilization.

[Humidity Conditioning Treatment]

Humidity conditioning treatment typically refers to placing the gas barrier packaging material precursor of the present embodiment under the conditions of 10 to 99° C., atmospheric pressure, relative humidity of 20 to 99%.

An optimum range of the humidity conditioning time depends on temperature and humidity. Lower temperature and lower humidity needs a longer time for the humidity conditioning, while higher temperature and higher humidity can finish the treatment in a shorter time. For example, a gas barrier packaging material having sufficient gas barrier properties can be formed through humidity conditioning treatment performed for 10 hours or more under the conditions of 20° C. and relative humidity of 80%, three hours or more under the conditions of 40° C. and relative humidity of 90%, and 30 minutes or more under the conditions of 60° C. and relative humidity of 90%.

When one other substrate is laminated onto the gas barrier packaging material precursor of the present embodiment via an adhesive, the humidity conditioning time taken for exhibiting sufficient gas barrier properties becomes longer in comparison with the case where the other substrate is not laminated.

In the gas barrier packaging material of the present embodiment, when the barrier layer is separated and an infrared absorption spectrum of the barrier layer is measured by a transmission method, a ratio ($\alpha/\beta$) of a maximum peak height ($\alpha$) of absorbance in a range of about 1490 to about 1659 cm$^{-1}$ to a maximum peak height ($\beta$) of absorbance in a range of about 1660 to about 1750 cm$^{-1}$ is 1 or more.

The infrared absorption spectrum can be measured by the following method, for example.

Firstly, the barrier layer is separated from the gas barrier packaging material. The separation method can be a method of separating the barrier layer directly from the protective layer.

Then, the separated barrier layer is subjected to measurement of the infrared absorption spectrum by means of a transmission method using FT-JR1710 manufactured by Perkin-Elmer.

In the infrared absorption spectrum thus obtained, a ratio ($\alpha/\beta$) between the maximum peak height ($\alpha$) in absorbance peaks appearing in a range of about 1490 to about 1659 cm$^{-1}$ and a maximum peak height ($\beta$) in absorbance peaks appearing in a range of about 1660 to about 1750 cm$^{-1}$ is calculated.

When the polycarboxylic acid polymer used for the barrier layer forms an ionic crosslink, an absorption maximum derived from C=O stretching vibration of the salt (—COO—) of the carboxyl group is shown in the vicinity of 1560 cm$^{-1}$, while the maximum peak height (β) of absorbance in a range of about 1490 to about 1659 cm$^{-1}$ serves as a measure for indicating the extent to which the ionic crosslink has been formed.

On the other hand, a carboxyl group before forming an ionic crosslink shows an absorption maximum derived from C=O stretching vibration of a carboxyl group (—COOH) in the vicinity of 1720 cm$^{-1}$, while the maximum peak height (α) of absorbance in a range of about 1660 to about 1750 cm$^{-1}$ serves as a measure for indicating an abundance of carboxyl groups that have not formed an ionic crosslink.

In the present embodiment, the ratio (α/β) of infrared absorption spectrum peaks of the barrier layer is 1 or more. When the ratio (α/β) of infrared absorption spectrum peaks is 1 or more, most of the carboxyl groups of the polycarboxylic acid polymer in the barrier layer indicate that an ionic crosslink has been formed. When an ionic crosslink is formed, sufficient oxygen gas barrier properties are achieved in the gas barrier packaging material.

The gas barrier packaging material precursor of the present embodiment, when not subjected to retort treatment or the like, will have the ratio (α/β) of infrared absorption spectrum peaks of less than 1, and thus is imparted with flexibility. In contrast, after retort treatment or the like, the gas barrier packaging material of the present embodiment will have the ratio (α/β) of infrared absorption spectrum peaks of 1 or more, and thus most of the carboxy groups of the polycarboxylic acid polymer form an ionic crosslink with the polyvalent metal ions, thereby achieving sufficient oxygen barrier properties.

<Range of Oxygen Permeability>

The gas barrier packaging material of the present embodiment is obtained by applying at least one treatment selected from the group consisting of retort treatment, boiling treatment, and humidity conditioning treatment to the gas barrier packaging material precursor of the present embodiment. At a temperature of 30° C. and relative humidity of 70%, the gas barrier packaging material obtained in this way typically has oxygen permeability of 300 cm$^3$ (STP)/m$^2$·day·MPa or less, preferably 200 cm$^3$ (STP)/m$^2$·day·MPa or less, more preferably 100 cm$^3$ (STP)/m$^2$·day·MPa or less, and particularly preferably 10 cm$^3$ (STP)/m$^2$·day·MPa or less.

The gas barrier packaging material precursor of the present embodiment can be abused with the application of a stress, such as stretching and bending, before being subjected to at least one treatment selected from the group consisting of retort treatment, boiling treatment, and humidity conditioning treatment. In this case as well, sufficient gas barrier properties are exhibited by the gas barrier packaging material of the present embodiment obtained by applying at least one treatment selected from the group consisting of retort treatment, boiling treatment, and humidity conditioning treatment to the gas barrier packaging material precursor of the present embodiment. When the gas barrier packaging material precursor of the present embodiment is subjected to at least one treatment selected from the group consisting of retort treatment, boiling treatment, and humidity conditioning treatment after being abused, the resultant gas barrier packaging material of the present embodiment will typically have oxygen permeability, at 30° C. temperature and 70% relative humidity, of 300 cm$^3$ (STP)/m$^2$·day·MPa or less, preferably 200 cm$^3$ (STP)/m$^2$·day·MPa or less, more preferably 100 cm$^3$ (STP)/m$^2$·day·MPa or less, and particularly preferably 30 cm$^3$ (STP)/m$^2$·day·MPa or less.

<Application (Lamination)>

The gas barrier packaging material of the present embodiment may be laminated with one other substrate for the purpose of giving strength, sealing properties, easy unsealability, design properties, light blocking properties, and the like. In addition, the gas barrier packaging material of the present embodiment may be formed by applying at least one treatment selected from the group consisting of retort treatment, boiling treatment, and humidity conditioning treatment, after laminating the other substrate onto the gas barrier packaging material precursor of the present embodiment.

The other substrate is appropriately selected according to the purpose, but, typically, plastic films or papers are favorably used. Such plastic films or papers may be laminated singly, or in combination of two or more.

The form of the substrate is not particularly limited. For example, the substrate can be in the form of a film, sheet, bottle, cup, tray, tank, tube, and the like. Of these substrates, from the perspective of laminating the gas barrier packaging material, a film or a sheet is preferable. Also, a sheet before being molded into a cup, or a flattened tube is preferable.

As the method of laminating the gas barrier packaging material of the present embodiment with the other substrate, a method of lamination using an adhesive according to a lamination technique can be used. Specific examples of the lamination technique include dry lamination, wet lamination, extrusion lamination, and the like.

There is no particular limitation in the mode of laminating the gas barrier packaging material of the present embodiment with the other substrate. From the perspective of handleability of a product to be obtained, modes of lamination that can be used include, for example, (a) gas barrier packaging material/polyolefin, (b) gas barrier packaging material/polyolefin (tube shaped)/gas barrier packaging material, (c) gas barrier packaging material/nylon/polyolefin, (d) gas barrier packaging material/polyolefin/paper/polyolefin, (e) polyolefin/gas barrier packaging material/polyolefin, (f) polyolefin/gas barrier packaging material/nylon/polyolefin, (g) polyethylene terephthalate/gas barrier packaging material/nylon/polyolefin, and the like.

These laminates may each be repeatedly laminated.

From the perspective of giving design properties, light blocking properties, moisture prevention properties, and the like, each laminate may be laminated with a printed layer or a deposited layer of metal or a silicon compound.

From the perspective of the barrier properties, it is preferable that a laminated surface of the gas barrier packaging material is not arranged in an outermost layer. When the laminated surface of the gas barrier packaging material is arranged in the outermost layer, the barrier layer and the like are scraped, creating a factor of impairing barrier properties.

EXAMPLES

The present invention will be even more specifically described by way of examples and comparative examples. However, the present invention is not limited to the examples set forth below.

Preparation Example 1

A coating liquid A1 was prepared through the following procedure.

A polyol, a Si agent, a curing agent, and ethyl acetate were formulated so as to have a mass and a solid content concentration shown in Table 1 to thereby prepare the coating liquid A1.

As the polyol, an acrylic polyol having a hydroxyl value of 100 (trade name: Dianal LR254, manufactured by Mitsubishi Rayon Co., Ltd.) was used.

As the Si agent, 3-isocyanatepropyltriethoxysilane (trade name: KBE9007, manufactured by Shin-Etsu Silicone) was used.

As the curing agent, diisocyanate (trade name: TAKENATE A56, manufactured by Polyurethane Business Sector, Mitsui Chemicals, Inc.) was used.

As the ethyl acetate, ethyl acetate manufactured by Tokyo Chemical Industry Co., Ltd. was used.

TABLE 1

|  | Mass (g) (Solid Content Concentration) |
|---|---|
| Polyol | 10 (50%) |
| Si Agent | 1 (100%) |
| Curing Agent | 6.25 (56.25%) |
| Ethyl Acetate | 300 (—) |
| Total | 317.25 (3%) |

A coating liquid A2 was prepared through the following procedure.

A polyol, a curing agent, and ethyl acetate were formulated so as to have a mass and a solid content concentration shown in Table 2 to thereby prepare the coating liquid A2.

As the polyol, polyester polyol (trade name: TAKELAC A525, manufactured by Polyurethane Business Sector, Mitsui Chemicals, Inc.) was used.

As the curing agent, diisocyanate (trade name: TAKENATE A52, manufactured by Polyurethane Business Sector, Mitsui Chemicals, Inc.) was used.

As the ethyl acetate, ethyl acetate manufactured by Tokyo Chemical Industry Co., Ltd. was used.

TABLE 2

|  | Mass (g) (Solid Content Concentration) |
|---|---|
| Polyol | 36 (50%) |
| Curing Agent | 4 (75%) |
| Ethyl Acetate | 2060 (—) |
| Total | 1010 (2%) |

Preparation Example 3

A coating liquid B was prepared through the following procedure.

Polycarboxylic acid, zinc oxide, a Si agent, distilled water, and 2-propanol were formulated so as to have a mass and a solid content concentration shown in Table 3 to thereby prepare the coating liquid B.

As the polycarboxylic acid, polyacrylic acid (trade name: ARON A-10H, manufactured by Toagosei Co., Ltd.) was used.

As the zinc oxide, zinc oxide manufactured by Tokyo Chemical Industry Co., Ltd. was used.

As the Si agent, 3-glycidoxypropyltrimethoxysilane (trade name: KBM403, manufactured by Shin-Etsu Silicone) was used.

As the 2-propanol, 2-propanol manufactured by Tokyo Chemical Industry Co., Ltd. was used.

TABLE 3

|  | Mass (g) (Solid Content Concentration) |
|---|---|
| Polycarboxylic Acid | 160 (25%) |
| Zinc Oxide | 4.52 (100%) |
| Si Agent | 1.16 (100%) |
| Distilled Water | 937.6 (—) |
| 2-Propanol | 862.4 (—) |
| Total | 2200 (2%) |

Preparation Example 4

A coating liquid C-1 was prepared through the following procedure.

Zinc oxide, a sodium salt of a polycarboxylic acid resin, and water were formulated so as to have a mass and a solid content concentration shown in Table 4 to thereby prepare the coating liquid C-1.

As the zinc oxide, ultrafine particles of zinc oxide (trade name: FINEX 50, manufactured by Sakai Chemical Industry Co., Ltd.) were used.

As the sodium salt of a polycarboxylic acid resin, sodium polyacrylate (trade name: ARON T-50, manufactured by Toagosei Co., Ltd.) was used.

To stir a mixture of the zinc oxide, the sodium salt of the polycarboxylic acid resin, and the water, a high speed stirrer (trade name: T.K FILMIX, manufactured by PRIMIX Corp.) was used.

TABLE 4

|  | Mass (g) (Solid Content Concentration) |
|---|---|
| Zinc Oxide | 30.0 (100%) |
| Sodium Salt of Polycarboxylic acid resin | 3.0 (40%) |
| Water | 67.0 (—) |
| Total | 100.0 (31.2%) |

Preparation Example 5

A coating liquid C-2 was prepared through the following procedure.

The coating liquid C-1, a polyester resin, 2-propanol, and water were formulated so as to have a mass and a solid content concentration shown in Table 5 to thereby prepare the coating liquid C-2.

As the polyester resin, elitel KT-8803 manufactured by UNITIKA Ltd. was used.

As the 2-propanol, 2-propanol manufactured by Tokyo Chemical Industry Co., Ltd. was used.

TABLE 5

|  | Mass (g) (Solid Content Concentration) |
|---|---|
| C-1 | 25.0 (31.2%) |
| Polyester Resin | 4.1 (20%) |
| 2-Propanol | 10.3 (—) |
| Water | 55.1 (—) |
| Total | 94.5 (9.6%) |

Preparation Example 6

A coating liquid C was prepared through the following procedure.

The coating liquid C-2 and an isocyanate compound were formulated so as to have a mass and a solid content concentration shown in Table 6 to thereby prepare the coating liquid C.

As the isocyanate compound, Liofol Hardener UR5889-21 manufactured by Henkel was used.

TABLE 6

|  | Mass (g) (Solid Content Concentration) |
| --- | --- |
| C-2 | 94.5 (9.6%) |
| Isocyanate Compound | 0.5 (100%) |
| Total | 95.0 (10.0%) |

Example 1

As a substrate, a stretched polyethylene terephthalate film (trade name: Lumirror P60, thickness 12 μm, manufactured by Toray Industries, Inc.) was used.

The coating liquid A1 was coated onto one surface of the substrate by means of multicoater TM-MC manufactured by HIRANO TECSEED Co., Ltd., followed by drying, thereby forming an adhesion layer (coating liquid A1 layer) with a thickness of 0.2 μm.

When coating the coating liquid A1, a grid-type gravure plate of 45 lpi and 200 μm depth was used.

A space used for drying the coating liquid A1 was divided into two regions, where a drying temperature in a first space was set to 60° C. and a drying temperature in a second space was set to 70° C.

A speed of 5 m/min was set for taking up the substrate and the substrate formed with the adhesion layer.

Then, the coating liquid B was coated onto the adhesion layer formed on one surface of the substrate, by means of multicoater TM-MC manufactured by HIRANO TECSEED Co., Ltd., followed by drying, thereby forming a barrier layer (coating liquid B layer) with a thickness of 0.3 μm.

When coating the coating liquid B, a grid-type gravure plate of 45 lpi and 200 μm depth was used.

A space used for drying the coating liquid B was divided into two regions, where a drying temperature in a first space was set to 85° C. and a drying temperature in a second space was set to 110° C.

A speed of 5 m/min was set for taking up the substrate formed with the adhesion layer, and the substrate formed with the adhesion layer and the barrier layer.

Then, the coating liquid C was coated onto the barrier layer formed on one surface of the substrate, by means of multicoater TM-MC manufactured by HIRANO TECSEED Co., Ltd., followed by drying, thereby forming a protective layer (coating liquid C layer) with a thickness of 0.5 μm. Thus, a gas barrier packaging material precursor of Example 1 was obtained, with a lamination being in the order of substrate/adhesion layer/barrier layer/protective layer.

When coating the coating liquid C, a grid-type gravure plate of 200 lpi and 38 μm depth was used.

A space used for drying the coating liquid C was divided into two regions, where a drying temperature in a first space was set to 35° C. and a drying temperature in a second space was set to 40° C.

A speed of 5 m/min was set for taking up the substrate formed with the adhesion layer and the barrier layer, and for the substrate formed with the adhesion layer, the barrier layer, and the protective layer.

The gas barrier packaging material precursor thus obtained was adhered sequentially with a stretched nylon film and a polypropylene film via an adhesive, by means of a multicoater TM-MC manufactured by HIRANO TECSEED Co., Ltd. Thus, a laminated film of Example 1 laminated in the order of gas barrier packaging material precursor/adhesive/stretched nylon film/adhesive/polypropylene film was obtained. Here, the laminated surface of the gas barrier packaging material precursor was arranged so as to contact the adhesive.

The laminated film thus obtained through adhesion was cured at 40° C. for 3 days.

As the adhesive, a two-liquid curing type adhesive, TAKELAC A620 (main component)/TAKENATE A65 (curing agent), manufactured by Polyurethane Business Sector, Mitsui Chemicals, Inc. was used.

As the stretched nylon film, a stretched nylon film, EMBLEM ONMB (thickness 15 μm) manufactured by UNITIKA Ltd. was used.

As the polypropylene film, a polypropylene film, TORAYFAN ZK93KM (thickness 60 μm), manufactured by TORAY ADVANCED FILM Co., Ltd. was used.

The laminated film thus obtained was subjected to retort treatment at a temperature of 120° C. for 30 minutes, with a pressure in a treatment vessel being set to 2 kg, using hot water storage type retort oven RCS-60/10TG manufactured by HISAKA WORKS, Ltd., thereby obtaining a gas barrier packaging material of Example 1.

Example 2

A gas barrier packaging material precursor of Example 2 laminated in the order of substrate/adhesion layer/protective layer/barrier layer was obtained similar to Example 1, except that the order of coating the coating liquids B and C was switched.

Further, similar to Example 1, a laminated film was prepared using the gas barrier packaging material precursor of Example 2, followed by retort treatment, thereby obtaining a gas barrier packaging material of Example 2.

Example 3

A gas barrier packaging material precursor of Example 3 laminated in the order of substrate/adhesion layer/barrier layer/protective layer was obtained similar to Example 1, except that zinc oxide was removed from the coating liquid B.

Further, similar to Example 1, a laminated film was prepared using the gas barrier packaging material precursor of Example 3, followed by retort treatment, thereby obtaining a gas barrier packaging material of Example 3.

Example 4

A gas barrier packaging material precursor of Example 4 laminated in the order of substrate/adhesion layer/barrier layer/protective layer was obtained similar to Example 1, except that the amount the zinc oxide in the coating liquid B was 2.26 g.

Further, similar to Example 1, a laminated film was prepared using the gas barrier packaging material precursor of Example 4, followed by retort treatment, thereby obtaining a gas barrier packaging material of Example 4.

Example 5

The gas barrier packaging material precursor obtained in Example 1 was adhered with a flattened tube made of polyethylene by means of multicoater TM-MC manufactured by HIRANO TECSEED Co., Ltd. to obtain a laminated tube of Example 5 having lamination in the order of gas barrier packaging material precursor/flattened tube made of polyethylene/gas barrier packaging material precursor.

As the flattened tube, a tube formed as follows was used.

A low density polyethylene (LDPE) resin was discharged by a twin screw extruder so as to be formed into a tube shape. The tube thus obtained was cooled and solidified in a water bath and then taken up to obtain a flattened tube.

As the low density polyethylene (LDPE) resin, NOVATEC LD LF420M manufactured by Japan Polypropylene Corp. was used.

As the twin screw extruder, TEM-26SS (screw diameter: 26 mm, L/D=60) manufactured by TOSHIBA MACHINE Co., Ltd. was used.

The laminated tube thus obtained was humidity-conditioned under the conditions of 40° C. and 90% relative humidity for 1 day, thereby obtaining a gas barrier packaging material of Example 5.

Example 6

A gas barrier packaging material precursor of Example 6 laminated in the order of substrate/adhesion layer/barrier layer/protective layer was obtained similar to Example 1, except that AQUALIC DL40S (solid content concentration of sodium polyacrylate of 40%) was used as the sodium salt of the polycarboxylic acid resin of the coating liquid C-1.

Further, similar to Example 1, a laminated film was prepared using the gas barrier packaging material precursor of Example 6, followed by retort treatment, thereby obtaining a gas barrier packaging material of Example 6.

Example 7

A gas barrier packaging material precursor of Example 7 laminated in the order of substrate/adhesion layer/barrier layer/protective layer was obtained similar to Example 1, except that ARON A-6330 (solid content concentration of acrylic acid-maleic acid copolymer of 40%) manufactured by Toagosei Co., Ltd. was used as the sodium salt of the polycarboxylic acid resin of the coating liquid C-1.

Further, similar to Example 1, a laminated film was prepared using the gas barrier packaging material precursor of Example 7, followed by retort treatment, thereby obtaining a gas barrier packaging material of Example 7.

Example 8

A gas barrier packaging material precursor of Example 8 laminated in the order of substrate/adhesion layer/barrier layer/protective layer was obtained similar to Example 1, except that POIZ 520 (solid content concentration of acrylic acid-maleic acid copolymer of 40%) manufactured by Kao Corp. was used as the sodium salt of the polycarboxylic acid resin of the coating liquid C-1.

Further, similar to Example 1, a laminated film was prepared using the gas barrier packaging material precursor of Example 8, followed by retort treatment, thereby obtaining a gas barrier packaging material of Example 8 was obtained.

Example 9

A gas barrier packaging material precursor of Example 9 laminated in the order of substrate/adhesion layer/barrier layer/protective layer was obtained similar to Example 1, except that the amount of the sodium salt of the polycarboxylic acid resin was 1.5 g and the amount of water was 68.5 g in the coating liquid C-1.

Further, similar to Example 1, a laminated film was prepared using the gas barrier packaging material precursor of Example 9, followed by retort treatment, thereby obtaining a gas barrier packaging material of Example 9.

Example 10

A gas barrier packaging material precursor of Example 10 laminated in the order of substrate/adhesion layer/barrier layer/protective layer was obtained similar to Example 1, except that the amount of the sodium salt of the polycarboxylic acid resin was 15 g and the amount of water was 55 g in the coating liquid C-1.

Further, similar to Example 1, a laminated film was prepared using the gas barrier packaging material precursor of Example 10, followed by retort treatment, thereby obtaining a gas barrier packaging material of Example 10.

Example 11

A gas barrier packaging material precursor of Example 11 laminated in the order of substrate/adhesion layer/barrier layer/protective layer was obtained similar to Example 1, except that Dianal LR2507 (acrylic polyol, hydroxyl value of 80) manufactured by Mitsubishi Rayon Co., Ltd. was used as the polyol of the coating liquid A1.

Further, similar to Example 1, a laminated film was prepared using the gas barrier packaging material precursor of Example 11, followed by retort treatment, thereby obtaining a gas barrier packaging material of Example 11.

Example 12

A gas barrier packaging material precursor of Example 12 laminated in the order of substrate/adhesion layer/barrier layer/protective layer was obtained similar to Example 1, except that Dianal LR209 (acrylic polyol, hydroxyl value of 134) manufactured by Mitsubishi Rayon Co., Ltd. was used as the polyol of the coating liquid A1.

Further, similar to Example 1, a laminated film was prepared using the gas barrier packaging material precursor of Example 12, followed by retort treatment of, thereby obtaining a gas barrier packaging material of Example 12.

Comparative Example 1

As a substrate, a stretched polyethylene terephthalate film (trade name: Lumirror P60, thickness of 12 μm, manufactured by Toray Industries, Inc.) was used.

The coating liquid A1 was coated onto one surface of the substrate by means of a multicoater TM-MC manufactured by HIRANO TECSEED Co., Ltd., followed by drying to form an adhesion layer with a thickness of 0.2 μm (coating liquid A1 layer).

When coating the coating liquid A2, a grid-type gravure plate of 45 lpi and of 200 μm depth was used.

A space used for drying the coating liquid A2 was divided into two regions, where a drying temperature in a first space was set to 60° C. and a drying temperature in a second space was set to 70° C.

A speed of 5 m/min was set for taking up the substrate and the substrate formed with the adhesion layer.

Then, metal aluminum was evaporated by means of an electron beam heating type vacuum deposition device to introduce an oxygen gas onto the adhesion layer formed on one surface of the substrate to thereby deposit the aluminum oxide and form an inorganic deposition layer (barrier layer) with a thickness of 20 nm.

Then, the coating liquid C was coated onto the barrier layer formed on one surface of the substrate by means of multicoater TM-MC manufactured by HIRANO TECSEED Co., Ltd., followed by drying to form a protective layer with a thickness of 0.5 μm (coating liquid C layer), thereby obtaining a gas barrier packaging material precursor of Comparative Example 1 having lamination in the order of substrate/adhesion layer/barrier layer/protective layer.

When coating the coating liquid C, a grid-type gravure plate of 200 lpi and 38 μm depth was used.

A space used for drying the coating liquid C was divided into two regions, where a drying temperature in a first space was set to 35° C. and a drying temperature in a second space was set to 40° C.

A speed of 5 m/min was set for taking up the substrate formed with the adhesion layer and the barrier layer, and the substrate formed with the adhesion layer, the barrier layer, and the protective layer.

After that, similar to Example 1, a laminated film was prepared using the gas barrier packaging material precursor of Comparative Example 1, followed by retort treatment, thereby obtaining a gas barrier packaging material of Comparative Example 1.

Comparative Example 2

As a substrate, a stretched polyethylene terephthalate film (trade name: Lumirror P60, thickness of 12 μm, produced by Toray Industries, Inc.) was used.

The coating liquid A2 was coated onto one surface of the substrate by means of multicoater TM-MC manufactured by HIRANO TECSEED Co., Ltd., followed by drying to form an adhesion layer with a thickness of 0.2 μm (coating liquid A2 layer).

When coating the coating liquid A2, a grid-type gravure plate of 45 lpi and 200 μm depth was used.

A space used for drying the coating liquid A2 was divided into two regions, where a drying temperature in a first space was set to 60° C. and a drying temperature in a second space was set to 70° C.

A speed of 5 m/min was set for taking up the substrate and the substrate formed with the adhesion layer.

Then, the coating liquid B was coated onto the adhesion layer formed on one surface of the substrate by means of multicoater TM-MC manufactured by HIRANO TECSEED Co., Ltd., followed by drying to form a barrier layer with a thickness of 0.3 μm (coating liquid B layer).

When coating the coating liquid B, a grid-type gravure plate of 45 lpi and of 200 μm depth was used.

A space used for drying the coating liquid B was divided into two regions, where a drying temperature in a first space was set to 85° C. and a drying temperature in a second space was set to 110° C.

A speed of 5 m/min was set for taking up the substrate formed with the adhesion layer, and the substrate formed with the adhesion layer and the barrier layer.

Then, the coating liquid C was coated onto the barrier layer formed on one surface of the substrate by means of multicoater TM-MC manufactured by HIRANO TECSEED Co., Ltd., followed by drying to form a protective layer with a thickness of 0.5 μm (coating liquid C layer), thereby obtaining a gas barrier packaging material precursor of Comparative Example 2 with lamination in the order of substrate/adhesion layer/barrier layer/protective layer.

When coating the coating liquid C, a grid-type gravure plate of 200 lpi and of 38 μm depth was used.

A space used for drying the coating liquid C was divided into two regions, where a drying temperature in a first space was set to 35° C. and a drying temperature in a second space was set to 40° C.

A speed of 5 m/min was set for taking up the substrate formed with the adhesion layer and the barrier layer, and the substrate formed with the adhesion layer, the barrier layer, and the protective layer.

After that, similar to Example 1, a laminated film was prepared using the gas barrier packaging material precursor of Comparative Example 2, followed by retort treatment, thereby obtaining a gas barrier packaging material of Comparative Example 2.

Comparative Example 3

A gas barrier packaging material precursor of Comparative Example 3 laminated in the order of substrate/adhesion layer/barrier layer/protective layer was obtained similar to Example 1, except that the coating liquid C-1 was composed of 30 g of zinc oxide and 70 g of water without adding the sodium salt of the polycarboxylic acid resin thereto.

Further, similar to Example 1, a laminated film was prepared using the gas barrier packaging material precursor of Comparative Example 3, followed by retort treatment, thereby obtaining a gas barrier packaging material of Comparative Example 3.

Comparative Example 4

A gas barrier packaging material precursor of Comparative Example 4 laminated in the order of substrate/adhesion layer/barrier layer/protective layer was obtained similar to Example 1, except that Dianal LR186 (acrylic resin, hydroxyl value of 0) manufactured by Mitsubishi Rayon Co., Ltd. was used instead of Dianal LR254 (acrylic polyol, hydroxyl value of 100) manufactured by Mitsubishi Rayon Co., Ltd. used for the coating liquid A1.

Further, similar to Example 1, a laminated film was prepared using the gas barrier packaging material precursor of Comparative Example 4, followed by retort treatment, thereby obtaining a gas barrier packaging material of Comparative Example 4.

[Evaluation]

(1) Abuse Test by Bending

The gas barrier packaging material precursors of Examples 1 to 12 and Comparative Examples 1 to 4 were bent 50 times by means of a Gelvo Flex tester manufactured by TESTER SANGYO Co., Ltd.

(2) Measurement of Oxygen Permeability

The oxygen permeability of the gas barrier packaging materials of Examples 1 to 12 and Comparative Examples 1 to 4 was measured.

The oxygen permeability of the gas barrier packaging materials was measured under the conditions of 30° C. temperature and 70% relative humidity, using oxygen transmission tester OXTRAN TM2/20 manufactured by Modern Control.

The measurement was made in conformity with ASTM F 1927-98 (2004) and the measured values were indicated by the unit of cm³ (STP)/(m²-day-MPa). Here, (STP) refers to standard conditions (0° C., 1 atm. pressure) for defining an oxygen volume.

The evaluation results are shown in Table 7.

(3) Measurement of Haze

The haze of the gas barrier packaging materials of Examples 1 to 12 and Comparative Examples 1 to 4 was measured using haze meter Haze Meter NDH2000 manufactured by NIPPON DENSHOKU INDUSTRIES Co., Ltd.

The evaluation results are shown in Table 7.

(4) Evaluation of Dispersibility of Precursor Liquid C-2 of Coating Liquid C

In Examples 1 to 12 and Comparative Examples 1 to 4, the precursor liquid C-2 was enclosed and sealed in an 18-liter metal can, and then stored in an environment of 30° C. for 1 month. Then, dispersibility of the precursor liquid C-2 of the coating liquid C of the protective layer was evaluated by visually observing the presence of aggregates and precipitations.

Dispersibility was evaluated on a three-point scale, where A: no aggregate and no precipitation occurred, B: aggregates were found in the coating liquid, and C: aggregates were found and precipitations occurred at the bottom of the can.

The evaluation results are shown in Table 7.

(5) Blocking Evaluation

In Examples 1 to 12 and Comparative Examples 1 to 4, the adhesion layer was laminated on the substrate and taken up in a roll shape. Then, blocking properties were evaluated by drawing the substrate.

The blocking properties were evaluated on a three-point scale, where A: the substrate was smoothly drawn, B: the adhesion layer and the substrate (non-laminated surface) were adhered to each other and were not smoothly drawn, and C: the adhesion layer and the substrate (non-laminated surface) were firmly adhered to each other and the substrate as broken when drawn.

The evaluation results are shown in Table 7.

(6) Measurement of Infrared Absorption Spectrum

Figure 1:
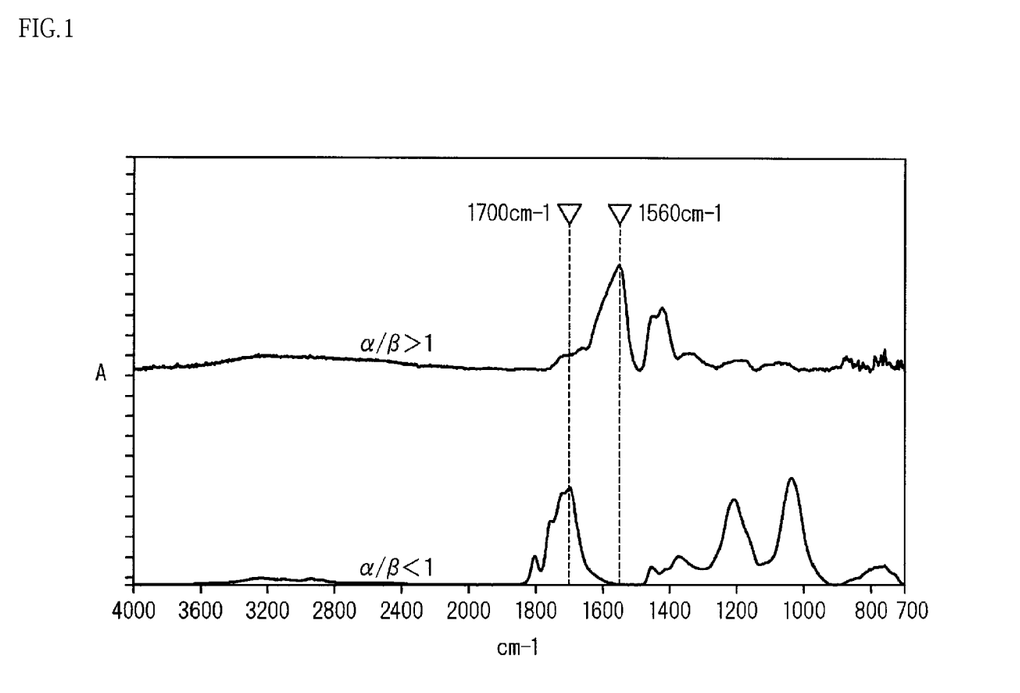
FIG. 1 is a diagram illustrating a result of measuring infrared absorption spectra of a barrier layer of a gas barrier packaging material precursor and a barrier layer of a gas barrier packaging material.

Infrared absorption spectrum of the barrier layer of the gas barrier packaging material precursor of Example 2 and the barrier layer of the gas barrier packaging material of Example 2 were measured.

The barrier layer was separated from the gas barrier packaging material precursor and the gas barrier packaging material to measure the infrared absorption spectrum of the barrier layer by a transmission method using FT-JR1710 manufactured by Perkin-Elmer.

The evaluation results are illustrated in FIG. 1.

TABLE 7

| | Oxygen Permeability 30° C., 70% PH (cm³ (STP)/m²-day-MPa) | | | | |
|---|---|---|---|---|---|
| | After Retort treatment | Retort treatment After Bending | Haze (%) | Dispersibility of Precursor Liquid C-2 | Blocking Evaluation |
| Ex. 1 | 5 | 5 | 3 | A | A |
| Ex. 2 | 5 | 5 | 3 | A | A |
| Ex. 3 | 5 | 5 | 5 | A | A |
| Ex. 4 | 5 | 5 | 4 | A | A |
| Ex. 5 | 5 | 5 | 3 | A | A |
| Ex. 6 | 5 | 5 | 3 | A | A |
| Ex. 7 | 5 | 5 | 3 | A | A |
| Ex. 8 | 5 | 5 | 3 | A | A |
| Ex. 9 | 5 | 5 | 3 | A | A |
| Ex. 10 | 5 | 5 | 3 | A | A |
| Ex. 11 | 5 | 5 | 3 | A | A |
| Ex. 12 | 5 | 5 | 3 | A | A |
| Comp. Ex. 1 | 5 | 5 | 3 | A | C |
| Comp. Ex. 2 | 5 | 200 | 3 | A | C |
| Comp. Ex. 3 | 10 | 10 | 9 | C | A |
| Comp. Ex. 4 | 5 | 5 | 3 | A | B |

From the results shown in Table 7, the gas barrier packaging materials of Examples 1 to 12 had very low oxygen permeability in comparison with the gas barrier packaging materials of Comparative Examples 1 to 4 after retort treatment, and after retort treatment following abuse by bending. Thus, it was found that the gas barrier packaging materials of Examples 1 to 12 had good gas barrier properties.

The precursor liquids C-2 of the coating liquids C in Examples 1 to 12 produced neither aggregate nor precipitation after storage in the environment of 30° C. for 1 month. Thus, it was found that precursor liquids C-2 of the coating liquids C of Examples 1 to 12 had good storage stability.

In Examples 1 to 12, no blocking was found between the substrate and the adhesion layer. Thus, it was found that one head coater enabled lamination in these examples.

From the results of FIG. 1, the barrier layer of the gas barrier packaging material precursor of Example 2 exhibited an absorption maximum derived from C=O stretching vibration of the carboxyl group (—COOH) in the vicinity of 1720 cm$^{-1}$. Thus, it was confirmed that the carboxyl groups formed no ionic crosslink.

In addition, from the results of FIG. 1, the barrier layer of the gas barrier packaging material of Example 2 exhibited an absorption maximum derived from C=O stretching vibration of the salt of the carboxyl group (—COO—) in the vicinity of 1560 cm$^{-1}$. Thus, it was confirmed that the carboxyl groups formed ionic crosslinks.

INDUSTRIAL APPLICABILITY

The gas barrier packaging material of the present invention is obtained by applying at least one treatment selected from the group consisting of retort treatment, boiling treatment, and humidity conditioning treatment to the gas barrier packaging material precursor of the present invention, and has very low oxygen permeability and good gas barrier properties. The gas barrier packaging material of the present invention can be subjected to printing or a post-process, such as dry lamination, melt extrusion lamination, or thermocompression lamination. Thus, packaging materials with a wide range of actual use in the packaging field for food products, pharmaceutical products, and the like can be provided.

What is claimed is:

1. A gas barrier packaging material precursor, comprising:
   a support;
   an adhesion layer provided on one surface of the support;
   a barrier layer and a protective layer formed adjacent to each other on the adhesion layer,
   wherein said precursor has a laminated structure in which the adhesion layer, the barrier layer and the protective layer are formed in this order on the surface, alternatively, the adhesion layer, the protective layer, and the barrier layer are formed in this order on the surface;
   wherein the adhesion layer contains a composite of a silicon compound having an isocyanate group or a hydrolysate of the compound, an acrylic polyol, or an isocyanate compound;
   the barrier layer comprises a polycarboxylic acid polymer and at least one silicon compound (III) selected from the group consisting of a silane coupling agent represented by a general formula $Si(OR)_3Z$, a hydrolysate thereof, and a condensate of these materials, wherein R denotes an alkyl group having 1 to 6 carbon atoms, Z denotes an organic group containing a glycidyloxy group or an amino group, and each R may be the same or different from each other;
   wherein the protective layer being formed of a coating liquid containing a polyvalent metal compound, a polyester resin, and a dispersant; and the protective layer containing the polyvalent metal compound by about 40 to about 90 mass % relative to 100 mass % of the protective layer;
   and wherein when the barrier layer is separated from the gas barrier packaging material precursor to measure an infrared absorption spectrum of the barrier layer by a transmission method, a ratio ($\alpha/\beta$) of a maximum peak height ($\alpha$) of absorbance in a range of about 1490 to about 1659 cm$^{-1}$ to a maximum peak height ($\beta$) of absorbance in a range of about 1660 to about 1750 cm$^{-1}$ is less than about 1,
   wherein the acrylic polyol of the adhesion layer has a hydroxyl value in a range of 5 to 200 KOH mg/g.

2. The gas barrier packaging material precursor according to claim 1, wherein the dispersant is a sodium salt of a polycarboxylic acid resin.

3. The gas barrier packaging material precursor according to claim 1, wherein the coating liquid contains the dispersant by 2 to 20 mass % relative to 100 mass % of the polyvalent metal compound.

4. The gas barrier packaging material precursor according to claim 2, wherein the coating liquid contains the dispersant by 2 to 20 mass % relative to 100 mass % of the polyvalent metal compound.

5. A gas barrier packaging material obtained by having the gas barrier packaging material precursor comprising:
   a support;
   an adhesion layer provided on one surface of the support;
   a barrier layer and a protective layer formed adjacent to each other on the adhesion layer,
   wherein said precursor has a laminated structure in which the adhesion layer, the barrier layer and the protective layer are formed in this order on the surface, alternatively, the adhesion layer, the protective layer, and the barrier layer are formed in this order on the surface;
   wherein the adhesion layer contains a composite of a silicon compound having an isocyanate group or a hydrolysate of the compound, an acrylic polyol, or an isocyanate compound;
   the barrier layer comprises a polycarboxylic acid polymer and at least one silicon compound (III) selected from the group consisting of a silane coupling agent represented by a general formula $Si(OR)_3Z$, a hydrolysate thereof, and a condensate of these materials, wherein R denotes an alkyl group having 1 to 6 carbon atoms, Z denotes an organic group containing a glycidyloxy group or an amino group, and each R may be the same or different from each other;
   wherein the protective layer being formed of a coating liquid containing a polyvalent metal compound, a polyester resin, and a dispersant; and the protective layer containing the polyvalent metal compound by about 40 to about 90 mass % relative to 100 mass % of the protective layer;
   and wherein when the barrier layer is separated from the gas barrier packaging material precursor to measure an infrared absorption spectrum of the barrier layer by a transmission method, a ratio ($\alpha/\beta$) of a maximum peak height ($\alpha$) of absorbance in a range of about 1490 to about 1659 cm$^{-1}$ to a maximum peak height ($\beta$) of absorbance in a range of about 1660 to about 1750 cm$^{-1}$ is less than about 1;
   wherein the acrylic polyol of the adhesion layer has a hydroxyl value in a range of 5 to 200 KOH mg/g, and,
   that is subjected to at least one treatment selected from the group consisting of retort treatment, boiling treatment, and humidity conditioning treatment; and
   when the barrier layer is separated from the gas barrier packaging material to measure an infrared absorption spectrum of the barrier layer by a transmission method, a ratio ($\alpha/\beta$) of a maximum peak height ($\alpha$) of absorbance in a range of about 1490 to about 1659 cm$^{-1}$ to a maximum peak height ($\beta$) of absorbance in a range of about 1660 to about 1750 cm$^{-1}$ is about 1 or more.

6. A gas barrier packaging material obtained by having the gas barrier packaging material precursor according to claim 5, wherein the dispersant is a sodium salt of a polycarboxylic acid resin.

7. A gas barrier packaging material obtained by having the gas barrier packaging material precursor according to claim 5, wherein the coating liquid contains the dispersant by 2 to 20 mass % relative to 100 mass % of the polyvalent metal compound.

8. A gas barrier packaging material obtained by having the gas barrier packaging material precursor according to claim 5, wherein the dispersant is a sodium salt of a polycarboxylic acid resin and wherein the coating liquid contains the dispersant by 2 to 20 mass % relative to 100 mass % of the polyvalent metal compound.

9. A gas barrier packaging material obtained by having the gas barrier packaging material precursor according to claim 5, wherein a mass ratio between the acrylic polyol and the silicon compound in the adhesion layer is in a range of 1/1 to 1000/1.

10. A gas barrier packaging material obtained by having the gas barrier packaging material precursor according to claim 9, wherein the silicon compound in the adhesion layer is 3-isocyanatepropyltriethoxysilane or a hydrosylate thereof.

11. A gas barrier packaging material obtained by having the gas barrier packaging material precursor according to claim 5, wherein a mass ratio between the acrylic polyol and the silicon compound in the adhesion layer is in a range of 2/1 to 200/1.

12. A gas barrier packaging material obtained by having the gas barrier packaging material precursor according to claim 11, wherein the silicon compound in the adhesion layer is 3-isocyanatepropyltriethoxysilane or a hydrosylate thereof.

13. A gas barrier packaging material obtained by having the gas barrier packaging material precursor according to claim 6, wherein a mass ratio between the acrylic polyol and the silicon compound in the adhesion layer is in a range of 1/1 to 1000/1.

14. A gas barrier packaging material obtained by having the gas barrier packaging material precursor according to claim 13, wherein the is 3-isocyanatepropyltriethoxysilane or a hydrosylate thereof.

15. A gas barrier packaging material obtained by having the gas barrier packaging material precursor according to claim 6, wherein a mass ratio between the acrylic polyol and the silicon compound in the adhesion layer is in a range of 2/1 to 200/1.

16. A gas barrier packaging material obtained by having the gas barrier packaging material precursor according to claim 15, wherein the silicon compound in the adhesion layer is 3-isocyanatepropyltriethoxysilane or a hydrosylate thereof.

17. A gas barrier packaging material obtained by having the gas barrier packaging material precursor according to claim 7, wherein a mass ratio between the acrylic polyol and the silicon compound in the adhesion layer is in a range of 1/1 to 1000/1.

18. A gas barrier packaging material obtained by having the gas barrier packaging material precursor according to claim 17, wherein the silicon compound in the adhesion layer is 3-isocyanatepropyltriethoxysilane or a hydrosylate thereof.

19. A gas barrier packaging material obtained by having the gas barrier packaging material precursor according to claim 7, wherein a mass ratio between the acrylic polyol and the silicon compound in the adhesion layer is in a range of 2/1 to 200/1.

20. A gas barrier packaging material obtained by having the gas barrier packaging material precursor according to claim 19, wherein the silicon compound in the adhesion layer is 3-isocyanatepropyltriethoxysilane or a hydrosylate thereof.

21. A gas barrier packaging material obtained by having the gas barrier packaging material precursor according to claim 8, wherein a mass ratio between the acrylic polyol and the silicon compound in the adhesion layer is in a range of 1/1 to 1000/1.

22. A gas barrier packaging material obtained by having the gas barrier packaging material precursor according to claim 8, wherein a mass ratio between the acrylic polyol and the silicon compound in the adhesion layer is in a range of 2/1 to 200/1.

23. A gas barrier packaging material obtained by having the gas barrier packaging material precursor according to claim 22, wherein the silicon compound in the adhesion layer is 3-isocyanatepropyltriethoxysilane or a hydrosylate thereof.

24. A gas barrier packaging material obtained by having the gas barrier packaging material precursor according to claim 22, wherein the silicon compound in the adhesion layer is 3-isocyanatepropyltriethoxysilane or a hydrosylate thereof.

* * * * *